(12) United States Patent
Tanno

(10) Patent No.: US 10,836,212 B2
(45) Date of Patent: Nov. 17, 2020

(54) PNEUMATIC TIRE

(71) Applicant: The Yokohama Rubber Co., LTD., Minato-ku, Tokyo (JP)

(72) Inventor: Atsushi Tanno, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 297 days.

(21) Appl. No.: 15/742,493

(22) PCT Filed: Aug. 4, 2016

(86) PCT No.: PCT/JP2016/072911
§ 371 (c)(1),
(2) Date: Jan. 5, 2018

(87) PCT Pub. No.: WO2017/022819
PCT Pub. Date: Feb. 9, 2017

(65) Prior Publication Data
US 2018/0201068 A1    Jul. 19, 2018

(30) Foreign Application Priority Data

| Aug. 6, 2015 | (JP) | ................................ | 2015-156121 |
| Aug. 6, 2015 | (JP) | ................................ | 2015-156122 |
| Aug. 6, 2015 | (JP) | ................................ | 2015-156123 |

(51) Int. Cl.
*B60C 9/18* (2006.01)
*B60C 9/00* (2006.01)

(52) U.S. Cl.
CPC .............. *B60C 9/1807* (2013.01); *B60C 9/00* (2013.01); *B60C 9/0042* (2013.01); *B60C 9/18* (2013.01); *B60C 2009/0071* (2013.01)

(58) Field of Classification Search
CPC . B60C 9/1807; B60C 2009/1814; B60C 9/00; B60C 9/18; B60C 2009/0071; B60C 9/0057; B60C 9/0064
See application file for complete search history.

(56) References Cited

U.S. PATENT DOCUMENTS

| 1,407,012 A | 2/1922 | Branson |
| 1,451,975 A | 4/1923 | Branson |

(Continued)

FOREIGN PATENT DOCUMENTS

| EP | 0 131 954 | 1/1985 | |
| EP | 0131954 A2 * | 1/1985 | ............. B60C 15/06 |

(Continued)

OTHER PUBLICATIONS

International Search Report for International Application No. PCT/JP2016/072911 dated Oct. 25, 2016, 5 pages, Japan.

*Primary Examiner* — Jacob T Minskey
*Assistant Examiner* — Virak Nguon
(74) *Attorney, Agent, or Firm* — Thorpe North & Western

(57) ABSTRACT

Provided is a pneumatic tire with an annular-shaped tread portion extending in a tire circumferential direction, a pair of sidewall portions disposed on both sides of the tread portion, and a pair of bead portions disposed inward of these sidewall portions in a tire radial direction. This pneumatic tire is also provided with a reinforcing member which includes a plurality of reinforcing cords oriented in at least three directions, and has a mesh-like structure with at least three of the reinforcing cords oriented in different directions joined together at at least a portion of intersecting locations of the reinforcing cords.

21 Claims, 29 Drawing Sheets

(56) References Cited

U.S. PATENT DOCUMENTS

| | | | |
|---|---|---|---|
| 3,255,614 A | | 6/1966 | Kemmnitz |
| 4,301,850 A | | 11/1981 | Schneider et al. |
| 4,708,187 A | | 11/1987 | Schmidt et al. |
| 4,731,137 A | * | 3/1988 | Schmidt ................ B60C 9/0042 152/559 |
| 4,811,773 A | | 3/1989 | Endo et al. |
| 4,838,966 A | | 6/1989 | Oswald |
| 9,895,935 B2 | * | 2/2018 | Shima ................ B60C 11/1376 |
| 2016/0167436 A1 | * | 6/2016 | Miyazono ............. B60C 9/1807 152/451 |

FOREIGN PATENT DOCUMENTS

| | | | |
|---|---|---|---|
| JP | S46-003682 | | 2/1971 |
| JP | S48-089985 | | 11/1973 |
| JP | S56-024149 | | 3/1981 |
| JP | S60-121102 | | 6/1985 |
| JP | S61-001505 | | 1/1986 |
| JP | S63-149209 | | 6/1988 |
| JP | H01-501382 | | 5/1989 |
| JP | H06-211003 | | 8/1994 |
| JP | 2010-221920 | | 10/2010 |
| JP | 2013-035362 | | 2/2013 |
| JP | 2013124011 A | * | 6/2013 |
| JP | 2014-227149 | | 12/2014 |
| JP | 2015-067229 | | 4/2015 |
| WO | WO 1988/03481 | | 5/1988 |
| WO | WO 2015/008547 | | 1/2015 |

\* cited by examiner

PNEUMATIC TIRE

TECHNICAL FIELD

The present technology relates to a pneumatic tire provided with a reinforcing member used for a reinforcing layer represented by a belt layer, a carcass layer, or a bead reinforcing layer, and particularly relates to a pneumatic tire which enables improvement of an in-plane bending rigidity while maintaining excellent flexibility with respect to an out-of-plane deformation of a reinforcing member, thereby enabling enhancement of tire characteristics.

BACKGROUND ART

In a pneumatic tire, a carcass layer is disposed extending between a pair of bead portions, and a belt layer is disposed on an outer circumferential side of the carcass layer in a tread portion. A reinforcing member that includes a plurality of reinforcing cords that incline with respect to the tire circumferential direction is used as the belt layer, and reinforcing cords are disposed so as to intersect each other between the layers of the belt layer (refer to Japanese Unexamined Patent Application Publication Nos. 61-1505, 01-501382, and 06-211003, for example).

Here, a cornering power can be increased and a rolling resistance can be reduced by improving an in-plane bending rigidity of the reinforcing member used for the belt layer. Nevertheless, in a conventional reinforcing member, the reinforcing cords are weakly connected, making it impossible for the reinforcing member to always exhibit adequate in-plane bending rigidity. Additionally, while the in-plane bending rigidity can be improved by making the reinforcing cord itself rigid, doing so results in a loss in flexibility with respect to an out-of-plane deformation of the reinforcing member.

In response, a reinforcing member having a mesh-like structure in which two reinforcing cords are joined together at intersecting locations has been proposed (refer to International Patent Application Publication No. WO 2015/8547, for example). Nevertheless, the effect of improving the in-plane bending rigidity of the reinforcing member is rarely achieved by simply joining two intersecting reinforcing cords, and thus the effects of increasing the cornering power and reducing the rolling resistance cannot be expected.

Further, while the carcass layer includes the plurality of reinforcing cords arranged in a tire radial direction, the reinforcing cords are substantially independent, resulting in merely a minor contribution to tire circumferential rigidity. As a result, when the tire circumferential rigidity is to be increased to enhance steering stability, for example, a bead reinforcing layer extending from the bead portion to a sidewall portion is generally added (refer to Japanese Unexamined Patent Application Publication Nos. 2012-221920, 2013-35362, and 2014-227149, for example).

Nevertheless, adding a bead reinforcing layer increases tire weight. Thus, relying on an additional bead reinforcing layer to enhance tire circumferential rigidity is not always the best policy.

Furthermore, the bead reinforcing layer used is a reinforcing member that includes a plurality of reinforcing cords inclined with respect to the tire circumferential direction.

Nevertheless, in a conventional reinforcing member, the reinforcing cords are weakly connected, making it impossible for the reinforcing member to always exhibit adequate in-plane bending rigidity. As a result, the tire circumferential rigidity cannot be effectively increased. Further, while increasing the number of bead reinforcing layers can improve the tire circumferential rigidity, increasing the number of bead reinforcing layers increases tire weight.

In response, the use of a reinforcing member having a mesh-like structure in which two reinforcing cords are joined together at intersecting locations as described above may be considered. Nevertheless, the effect of improving the in-plane bending rigidity of the reinforcing member is rarely achieved by simply joining two intersecting reinforcing cords, and thus the effect of increasing the tire circumferential rigidity cannot be expected.

SUMMARY

The present technology provides a pneumatic tire which enables improvement of an in-plane bending rigidity while maintaining excellent flexibility with respect to an out-of-plane deformation of a reinforcing member, thereby enabling enhancement of tire characteristics. In particular, in a pneumatic tire in which a reinforcing member is applied to a belt layer, the present technology makes it possible to increase cornering power and reduce rolling resistance. Further, in a pneumatic tire in which a reinforcing member is applied to a carcass layer, the present technology makes it possible to increase tire circumferential rigidity without relying on an additional bead reinforcing layer. Furthermore, in a pneumatic tire in which a reinforcing member is applied to a bead reinforcing layer, the present technology makes it possible to effectively increase tire circumferential rigidity.

The pneumatic tire according to the present technology for achieving the above-described object includes an annular-shaped tread portion extending in a tire circumferential direction, a pair of sidewall portions disposed on both sides of the tread portion, and a pair of bead portions disposed inward of these sidewall portions in a tire radial direction. This pneumatic tire is also provided with a reinforcing member that includes a plurality of reinforcing cords oriented in at least three directions, and has a mesh-like structure with at least three of the reinforcing cords oriented in different directions joined together at at least a portion of intersecting locations of the reinforcing cords.

In the present technology, because the reinforcing member includes the plurality of reinforcing cords oriented in at least three directions, and has a mesh-like structure in which at least three reinforcing cords oriented in different directions are joined together at at least a portion of the intersecting locations of the reinforcing cords, it is possible to improve the in-plane bending rigidity while maintaining excellent flexibility with respect to the out-of-plane deformation.

Thus, in a pneumatic tire that further includes a carcass layer disposed extending between the pair of bead portions, and a belt layer disposed on an outer circumferential side of the carcass layer in the tread portion, when the reinforcing member having a mesh-like structure described above is used as the belt layer, it is possible to increase cornering power and reduce rolling resistance. Further, the reinforcing member exhibits excellent flexibility with respect to out-of-plane deformation, making it possible to favorably maintain the durability of the belt layer.

The belt layer may be formed by winding the reinforcing member having a mesh-like structure one or more times in the tire circumferential direction, or by machining the reinforcing member having a mesh-like structure into an annular shape without ends. The former simplifies tire manufacture, and the latter improves tire durability.

Further, in a pneumatic tire that further includes a carcass layer disposed extending between the pair of bead portions, when the reinforcing member having a mesh-like structure in a region on the bead portion side is used as the carcass layer, the tire circumferential rigidity can be increased without relying on an additional bead reinforcing layer, and the steering stability can be enhanced without substantially increasing tire weight.

Preferably, the carcass layer is formed by machining the reinforcing member having a mesh-like structure into an annular shape without ends. As a result, the durability of the tire is improved.

Further, in a pneumatic tire that further includes a carcass layer disposed extending between the pair of bead portions and a bead reinforcing layer embedded in the bead portion, when the reinforcing member having a mesh-like structure is used as the bead reinforcing layer, the tire circumferential rigidity can be effectively increased, and the steering stability can be enhanced while suppressing an increase in tire weight.

Preferably, the density of the joined portion of the reinforcing cords of the reinforcing member constituting the bead reinforcing layer is made to increase inward in the tire radial direction. As a result, sudden changes in rigidity based on the reinforcing member are avoided, making it possible to prevent a decrease in durability.

Preferably, the bead reinforcing layer is formed by machining the reinforcing member having a mesh-like structure into an annular shape without ends. As a result, the durability of the tire is improved.

In the present technology, preferably at least three reinforcing cords are joined together at at least 30% of the intersecting locations where the at least three reinforcing cords intersect. As a result, the effect of improving the in-plane bending rigidity can be sufficiently achieved.

Further, preferably an intersection angle of at least three reinforcing cords joined at the intersecting locations is 15° or greater. As a result, the effect of increasing the in-plane bending rigidity can be sufficiently achieved.

Preferably, the reinforcing cord includes a synthetic fiber cord having a knot strength of 1.5 (cN/dtex) or greater. With a synthetic fiber cord, the reinforcing member having a mesh-like structure can be easily formed. Moreover, the synthetic fiber cord having the knot strength described above is suitable as a tire reinforcing material.

Further, preferably the reinforcing member having a mesh-like structure is coated with rubber. As a result, the integrity of the reinforcing cord is secured, making it possible to improve the in-plane bending rigidity of the reinforcing member.

DETAILED DESCRIPTION

Figure 1:
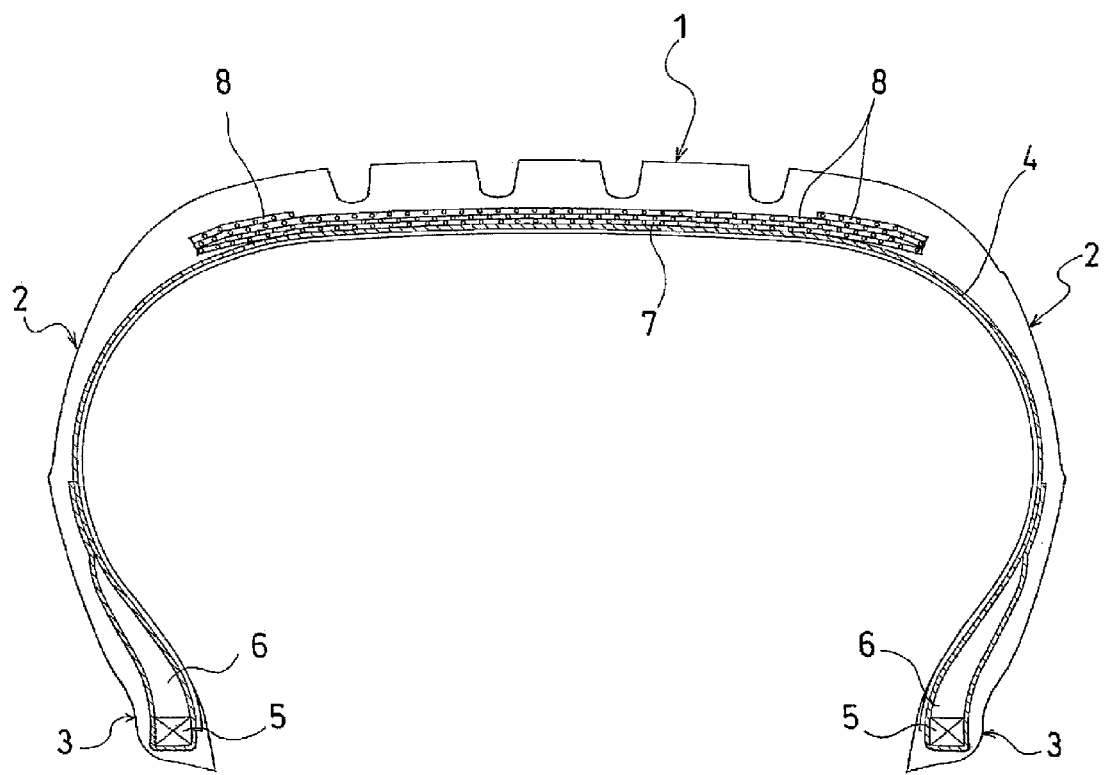
FIG. 1 is a meridian cross-sectional view illustrating a pneumatic tire according to an embodiment of the present technology.

The configuration of the present technology is described below in detail with reference to the accompanying drawings. FIG. 1 illustrates a pneumatic tire according to an embodiment of the present technology. As illustrated in FIG. 1, a pneumatic tire of the present embodiment includes an annular-shaped tread portion 1 extending in a tire circumferential direction, a pair of sidewall portions 2, 2 disposed on both sides of the tread portion 1, and a pair of bead portions 3, 3 disposed inward of the sidewall portions 2 in a tire radial direction.

A carcass layer 4 is disposed extending between the pair of bead portions 3, 3. The carcass layer 4 includes a plurality of reinforcing cords extending in the tire radial direction, and is folded back around a bead core 5 disposed in each of the bead portions 3 from a tire inner side to a tire outer side. A bead filler 6 having a triangular cross-sectional shape formed from a rubber composition is disposed on an outer periphery of the bead core 5.

On the other hand, a belt layer 7 is embedded on an outer circumferential side of the carcass layer 4 in the tread portion 1. This belt layer 7 includes a reinforcing member 10 having a specific mesh-like structure described below. For the purpose of improving high-speed durability, at least one layer of a belt cover layer 8 formed by arranging reinforcing cords at an angle of, for example, not greater than 5° with respect to the tire circumferential direction, is disposed on an outer circumferential side of the belt layer 7. Nylon, aramid, or similar synthetic fiber cords are preferably used as the reinforcing cords of the belt cover layer 8. Note that the belt cover layer 8 is not essential.

Figure 2:
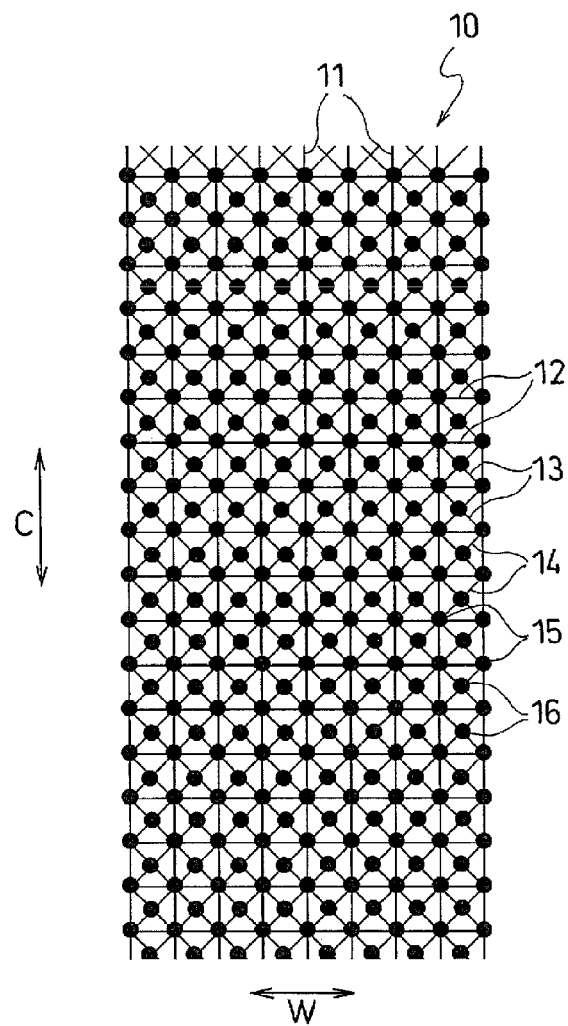
FIG. 2 is a plan view illustrating an example of a reinforcing member used for a belt layer of the pneumatic tire according to the present technology.

FIG. 2 illustrates an example of the reinforcing member used for the belt layer of the pneumatic tire according to the present technology. As illustrated in FIG. 2, the reinforcing member 10 having a mesh-like structure includes a plurality of reinforcing cords 11 to 14 oriented in four directions. That is, the reinforcing cord 11 extends in parallel with a tire circumferential direction C, the reinforcing cord 12 extends in parallel with a tire width direction W, the reinforcing cord 13 extends so as to incline to one side with respect to the tire circumferential direction C, and the reinforcing cord 14 extends so as incline to the other side with respect to the tire circumferential direction C. The plurality of reinforcing cords 11 to 14 oriented in different directions are joined together at intersecting locations of the reinforcing cords 11 to 14, forming a plurality of joined portions 15, 16. More specifically, at least three of the reinforcing cords 11 to 14 are integrally joined at the intersecting locations where at least three of the reinforcing cords 11 to 14 intersect to form a plurality of the joined portions 15, and the two reinforcing cords 13, 14 are integrally joined at the intersecting locations where the two reinforcing cords 13, 14 intersect to form a plurality of the joined portions 16.

The material of the reinforcing cords 11 to 14 is not particularly limited, allowing use of a synthetic fiber cord or a steel cord. Examples include a structure in which a synthetic fiber cord is used for all of the reinforcing cords 11 to 14, a structure in which a synthetic fiber cord is used for the reinforcing cords 11, 13, 14 while a steel cord is used for the reinforcing cord 12, a structure in which a steel cord is used for the reinforcing cord 11 while a synthetic fiber cord is used for the reinforcing cords 12 to 14, and a structure in which a steel cord is used for the reinforcing cords 11, 12 while a synthetic fiber cord is used for the reinforcing cords 13, 14.

The method of joining the reinforcing cords 11 to 14 is not particularly limited, allowing use of a variety of methods. With synthetic fiber cords, the joined portions 15, 16 can be formed so that the cords form a knot, the joined portions 15, 16 can be formed so that both fiber bundles (yarn) intersect each other without the cords forming a knot, the joined portions 15, 16 can be formed by welding the cords together, and the joined portions 15, 16 can be formed by adhering the cords together. With steel cords, the joined portions 15, 16 can be formed so that both filaments intersect each other without the cords forming a knot, the joined portions 15, 16 can be formed by welding the cords together, and the joined portions 15, 16 can be formed by adhering the cords together. In any case, the reinforcing cords 11 to 14 need to be integrally joined at intersecting locations so that the cords mutually regulate the cord positions.

The reinforcing member 10 configured as described above includes the plurality of reinforcing cords 11 to 14 oriented in at least three directions, and has a mesh-like structure in which at least three of the reinforcing cords 11 to 14 oriented in different directions are joined together at at least a portion of the intersecting locations of the reinforcing cords 11 to 14, making it possible to improve the in-plane bending rigidity while maintaining excellent flexibility with respect to out-of-plane deformation.

Figure 3:
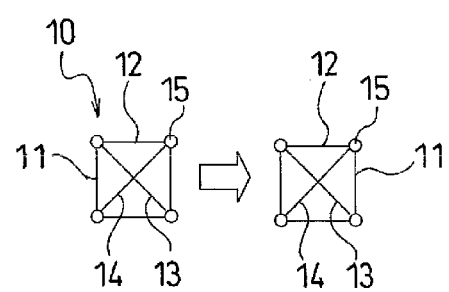
FIG. 3 is an explanatory diagram illustrating a deformation mechanism of a reinforcing member having a mesh-like structure in which at least three reinforcing cords oriented in different directions are joined together at intersecting locations of the reinforcing cords.
Figure 4:
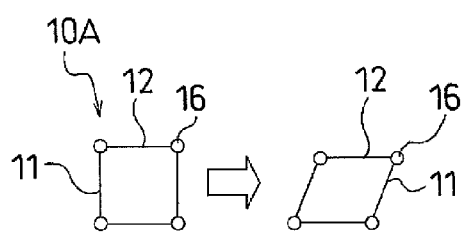
FIG. 4 is an explanatory diagram illustrating a deformation mechanism of the reinforcing member having a mesh-like structure in which two reinforcing cords oriented in different directions are joined together at intersecting locations of the reinforcing cords.

FIG. 3 illustrates a deformation mechanism of a reinforcing member having a mesh-like structure in which at least three reinforcing cords oriented in different directions are joined together at intersecting locations of the reinforcing cords, and FIG. 4 illustrates a deformation mechanism of the reinforcing member having a mesh-like structure in which two reinforcing cords oriented in different directions are joined together at intersecting locations of the reinforcing cords. As illustrated in FIG. 4, a reinforcing member 10A having a mesh-like structure in which the two reinforcing cords 11, 12 oriented in different directions are joined together at the intersecting locations of the reinforcing cords 11, 12 is deformed like a pantograph when forces act in a planar direction thereof. In contrast, as illustrated in FIG. 3, the reinforcing member 10 having a mesh-like structure in which at least three of the reinforcing cords 11 to 14 oriented in different directions are joined together at the intersecting locations of the reinforcing cords 11 to 14 is not readily susceptible to deformation even when forces act in the planar direction thereof, resulting in high in-plane bending rigidity.

Thus, in a pneumatic tire that further includes the carcass layer 4 disposed extending between the pair of bead portions 3, 3 and the belt layer 7 disposed on the outer circumferential side of the carcass layer 4 in the tread portion 1, when the reinforcing member 10 having a mesh-like structure described above is used as the belt layer 7, it is possible to increase cornering power and reduce rolling resistance. Further, the reinforcing member 10 exhibits excellent flexibility with respect to out-of-plane deformation, making it possible to favorably maintain the durability of the belt layer 7.

Figure 5:
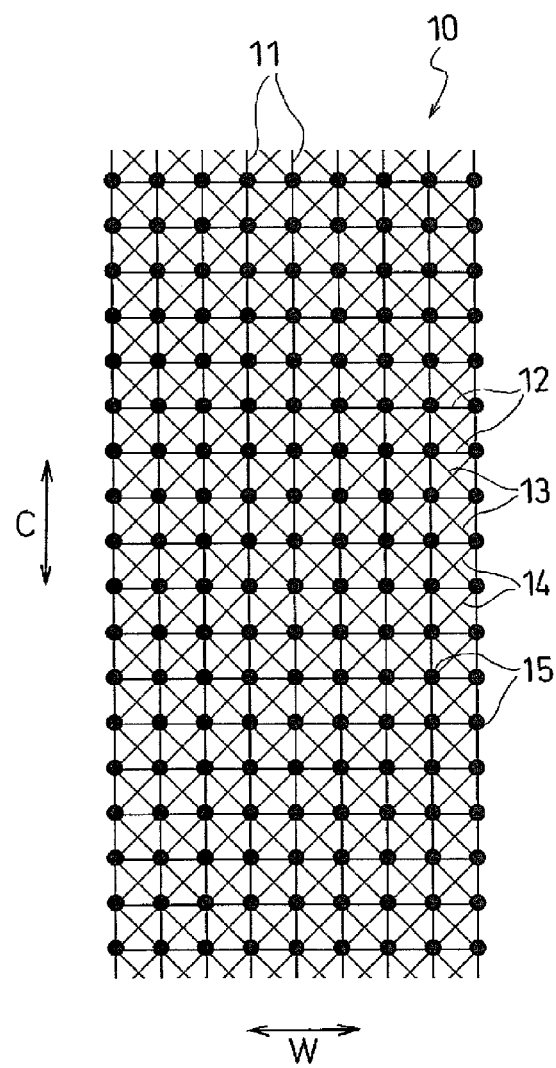
FIG. 5 is a plan view illustrating a modified example of the reinforcing member used for the belt layer of the pneumatic tire according to the present technology.

FIGS. 5 to 8 are views that illustrate modified examples of the reinforcing member used for the belt layer of the pneumatic tire of the present technology. In FIG. 5, although at least three of the reinforcing cords 11 to 14 are integrally joined at the intersecting locations where at least three of the reinforcing cords 11 to 14 intersect to form a plurality of the joined portions 15, the joined portion 16 is not formed at the intersecting locations where the two reinforcing cords 13, 14 intersect.

Figure 6:
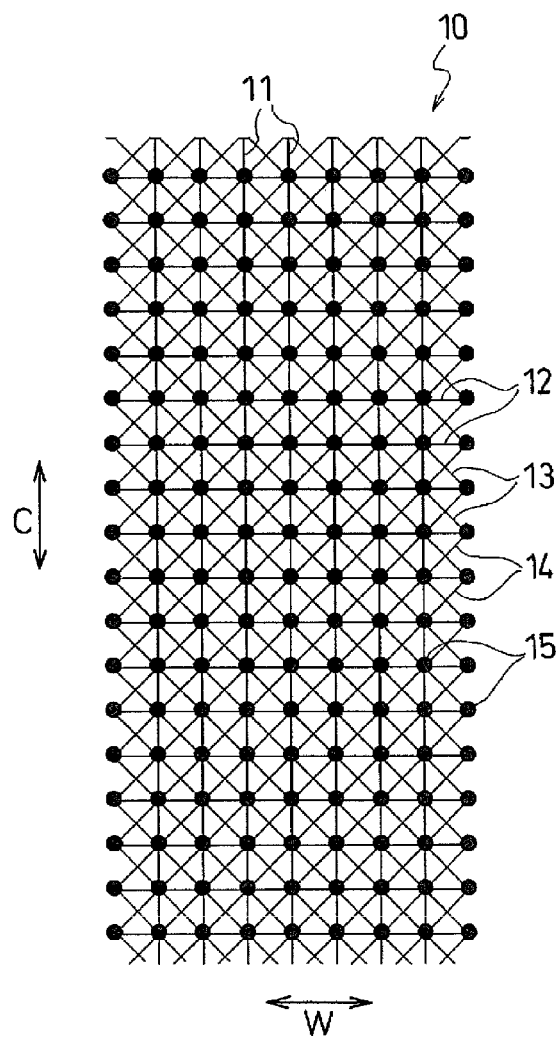
FIG. 6 is a plan view illustrating another modified example of the reinforcing member used for the belt layer of the pneumatic tire according to the present technology.
Figure 7:
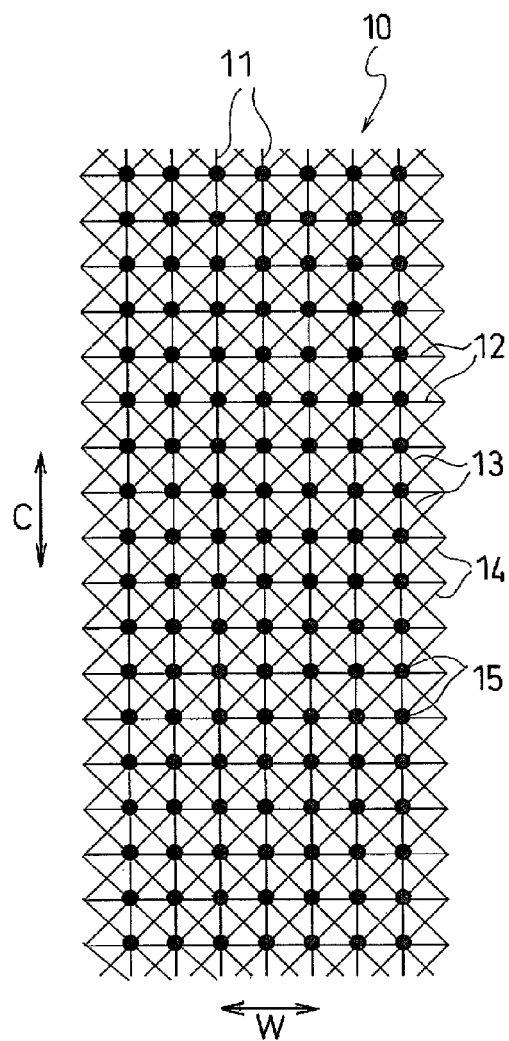
FIG. 7 is a plan view illustrating another modified example of the reinforcing member used for the belt layer of the pneumatic tire according to the present technology.
Figure 8:
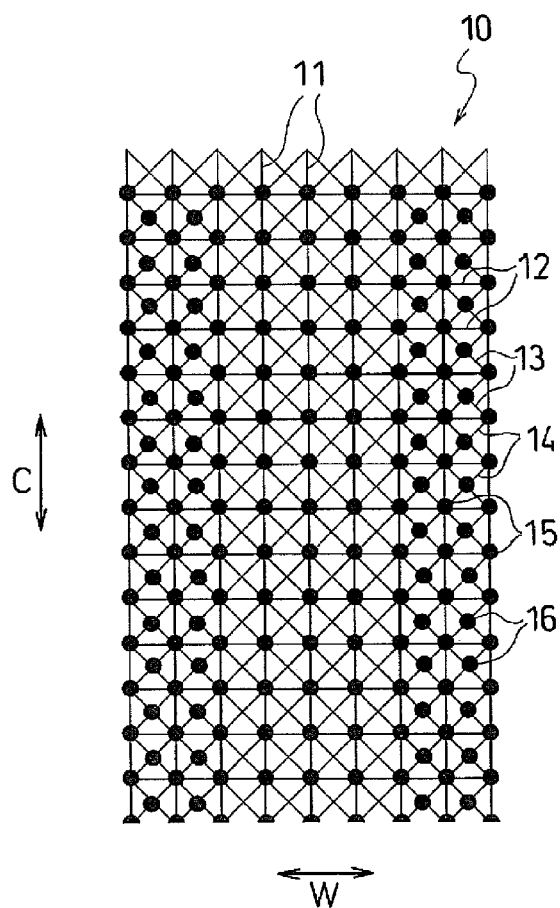
FIG. 8 is a plan view illustrating another modified example of the reinforcing member used for the belt layer of the pneumatic tire according to the present technology.

In FIG. 6, unlike FIG. 5, the reinforcing cord 11 extending in the tire circumferential direction C is not disposed at both end positions of the reinforcing member 10 in the tire width direction W. In FIG. 7, unlike FIG. 5, the reinforcing cord 11 extending in the tire circumferential direction C and the joined portion 15 are not disposed at both end positions of the reinforcing member 10 in the tire width direction W. In FIG. 8, unlike FIG. 5, the joined portion 16 is selectively formed at the intersecting locations where the two reinforcing cords 13, 14 intersect at both end portions of the reinforcing member 10 in the tire width direction W.

Figure 9:
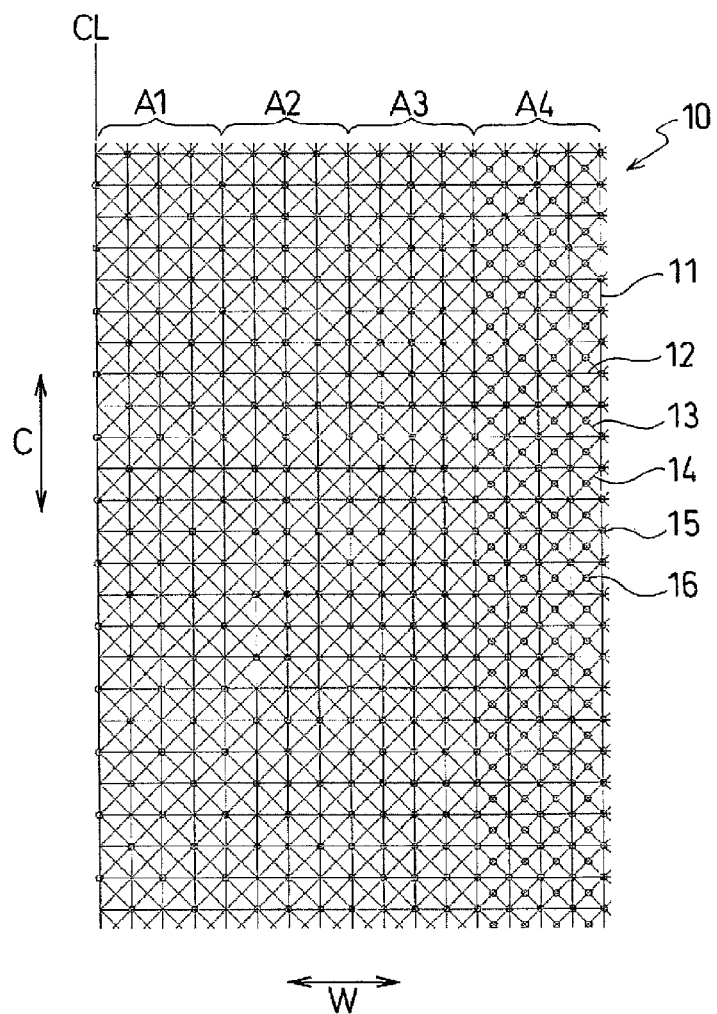
FIG. 9 is a plan view illustrating another modified example of the reinforcing member used for the belt layer of the pneumatic tire according to the present technology.

FIG. 9 illustrates another modified example of the reinforcing member used for the belt layer of the pneumatic tire according to the present technology. FIG. 9 illustrates only the left side of a tire center line CL, extracted. In FIG. 9, at least three of the reinforcing cords 11 to 14 are integrally joined at at least a portion of the intersecting locations where at least three of the reinforcing cords 11 to 14 intersect to form a plurality of the joined portions 15, and the two reinforcing cords 13, 14 are integrally joined at at least a portion of the intersecting locations where the two reinforcing cords 13, 14 intersect to form a plurality of the joined portions 16. Then, when the reinforcing member 10 is partitioned into four regions A1 to A4 outward in the tire width direction from the tire center line CL, the density of the joined portions 15, 16 of these regions A1 to A4 is set so as to increase outward in the tire width direction. According to such an arrangement, it is possible to more effectively increase the cornering power and more effectively reduce the rolling resistance.

Figure 10:
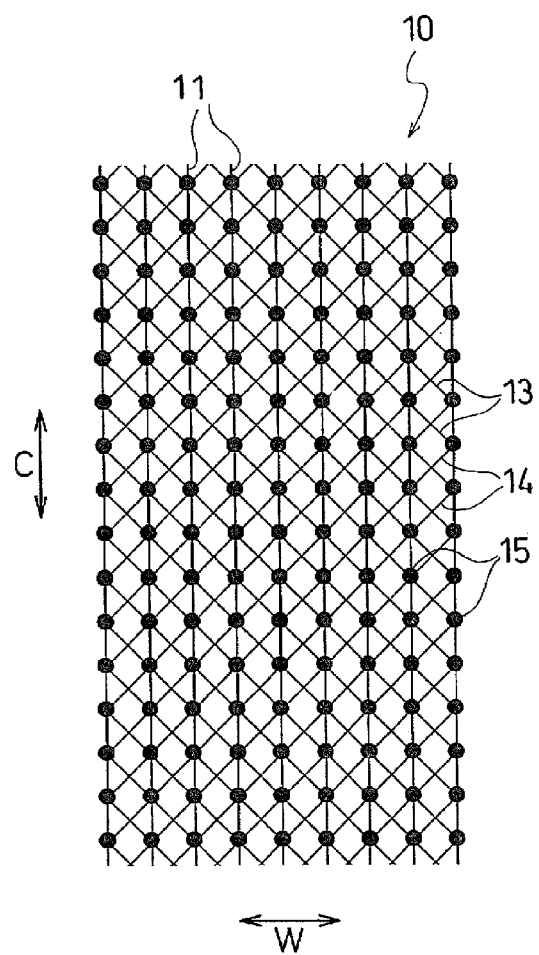
FIG. 10 is a plan view illustrating another modified example of the reinforcing member used for the belt layer of the pneumatic tire according to the present technology.

FIG. 10 illustrates another modified example of the reinforcing member used for the belt layer of the pneumatic tire according to the present technology. In FIG. 10, the reinforcing member 10 having a mesh-like structure includes the plurality of reinforcing cords 11, 13, 14 oriented in three directions. That is, the reinforcing cord 11 extends in parallel with the tire circumferential direction C, the reinforcing cord 13 extends so as to incline to one side with respect to the tire circumferential direction C, and the reinforcing cord 14 extends so as to incline to the other side with respect to the tire circumferential direction C. Then, at the intersecting locations where the three reinforcing cords 11, 13, 14 intersect, the three reinforcing cords 11, 13, 14 are integrally joined, forming a plurality of the joined portions 15.

The belt layer 7 described above can be formed by winding the reinforcing member 10 having a mesh-like structure one or more times in the tire circumferential direction. In this case, the reinforcing member 10 having a mesh-like structure can be treated in the same way as a conventional belt member, simplifying the manufacture of the pneumatic tire. Further, the reinforcing member 10 is preferably wound two or more times in the tire circumferential direction. At this time, the positions of the joined portion 15, 16 preferably differ for each winding.

Figure 11:
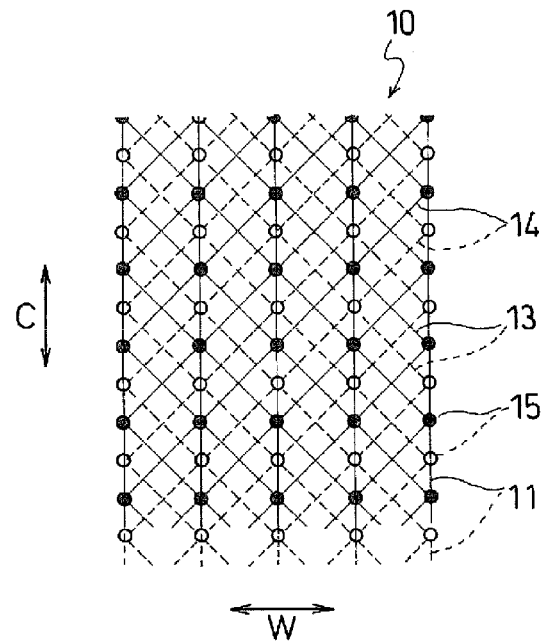
FIG. 11 is a plan view illustrating another modified example of the reinforcing member used for the belt layer of the pneumatic tire according to the present technology.
Figure 12:
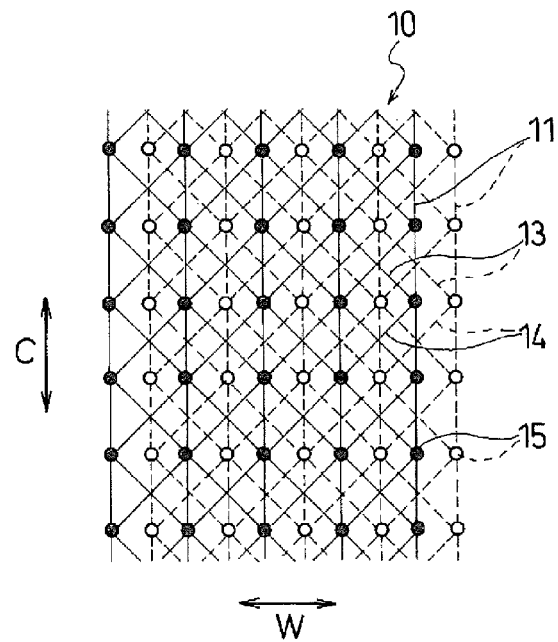
FIG. 12 is a plan view illustrating another modified example of the reinforcing member used for the belt layer of the pneumatic tire according to the present technology.

FIGS. 11 and 12 each illustrate another modified example of the reinforcing member used for the belt layer of the pneumatic tire of the present technology. In FIG. 11, the joined portions 15 of a first layer (dashed lines) inward in the tire radial direction, and the joined portions 15 of a second layer (solid lines) outward in the tire radial direction are mutually shifted in the tire circumferential direction C in a structure in which the reinforcing member 10 having a mesh-like structure is wound two times. In FIG. 12, the joined portions 15 of a first layer (dashed lines) inward in the tire radial direction, and the joined portions 15 of a second layer (solid lines) outward in the tire radial direction are mutually shifted in the tire width direction W in a structure in which the reinforcing member 10 having a mesh-like structure is wound two times.

Or, the belt layer 7 described above can be formed by machining the reinforcing member 10 having a mesh-like structure into an annular shape without ends. That is, the reinforcing member 10 can be woven and formed into an annular shape. In this case, the durability of the pneumatic tire is improved. Further, the belt layer 7 can also be configured by preparing and layering the reinforcing members 10 having an annular shape without ends and with different diameters. In such a case, the positions of the joined portions 15, 16 preferably differ between the layers.

Figure 13:
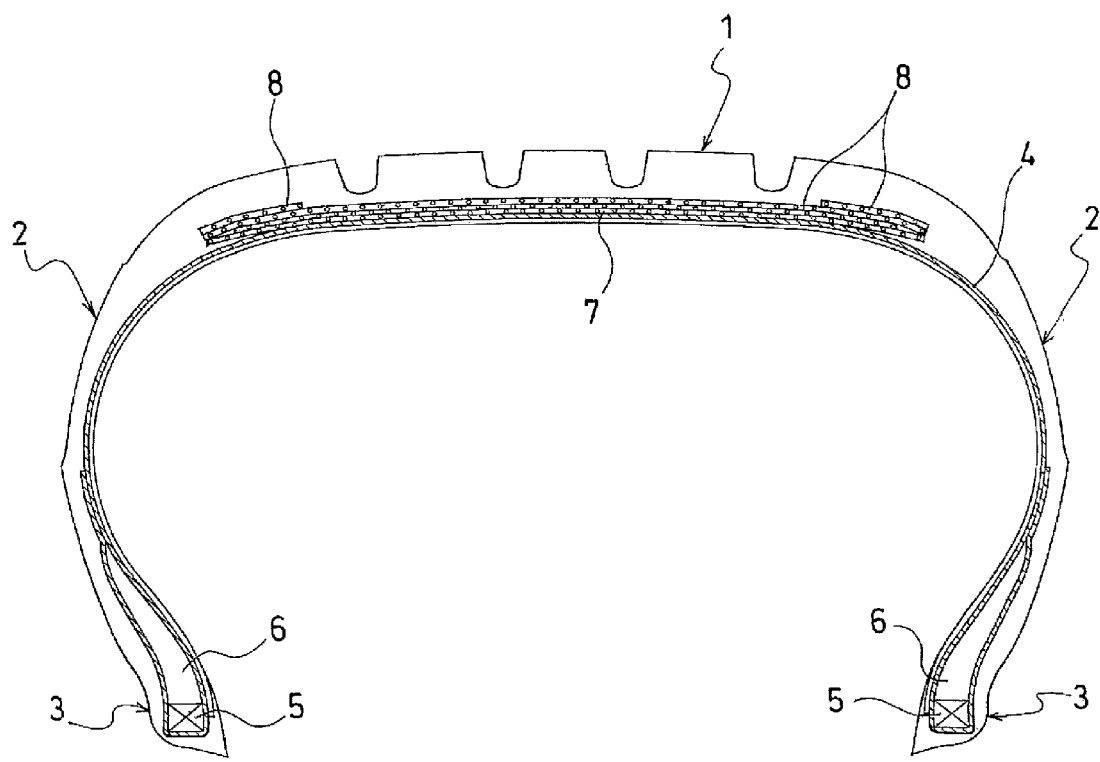
FIG. 13 is a meridian cross-sectional view illustrating a pneumatic tire according to another embodiment of the present technology.

FIG. 13 illustrates a pneumatic tire according to another embodiment of the present technology. As illustrated in FIG. 13, the pneumatic tire of the present embodiment includes the annular-shaped tread portion 1 extending in the tire circumferential direction, the pair of sidewall portions 2, 2 disposed on both sides of the tread portion 1, and the pair of bead portions 3, 3 disposed inward of the sidewall portions 2 in the tire radial direction.

The carcass layer 4 is disposed extending between the pair of bead portions 3, 3. The carcass layer 4 includes the reinforcing member 10 having a specific mesh-like structure described below, and is folded back around the bead cores 5 disposed in each of the bead portions 3 from the tire inner side to the tire outer side. The bead filler 6 having a triangular cross-sectional shape formed from a rubber composition is disposed on the outer periphery of the bead core 5.

On the other hand, the belt layer 7 is embedded on the outer circumferential side of the carcass layer 4 in the tread portion 1. The belt layer 7 includes a plurality of reinforcing cords that are inclined with respect to the tire circumferential direction, and is disposed so that the reinforcing cords of the different layers intersect each other. In the belt layer 7, the inclination angle of the reinforcing cords with respect to the tire circumferential direction is set in a range from, for example, 10° to 40°. Steel cords are preferably used as the reinforcing cords of the belt layer 7. For the purpose of improving high-speed durability, at least one layer of the belt cover layer 8 formed by arranging reinforcing cords at an angle of, for example, not greater than 5° with respect to the tire circumferential direction, is disposed on the outer circumferential side of the belt layer 7. Nylon, aramid, or similar synthetic fiber cords are preferably used as the reinforcing cords of the belt cover layer 8. Note that the belt cover layer 8 is not essential.

Figure 14:
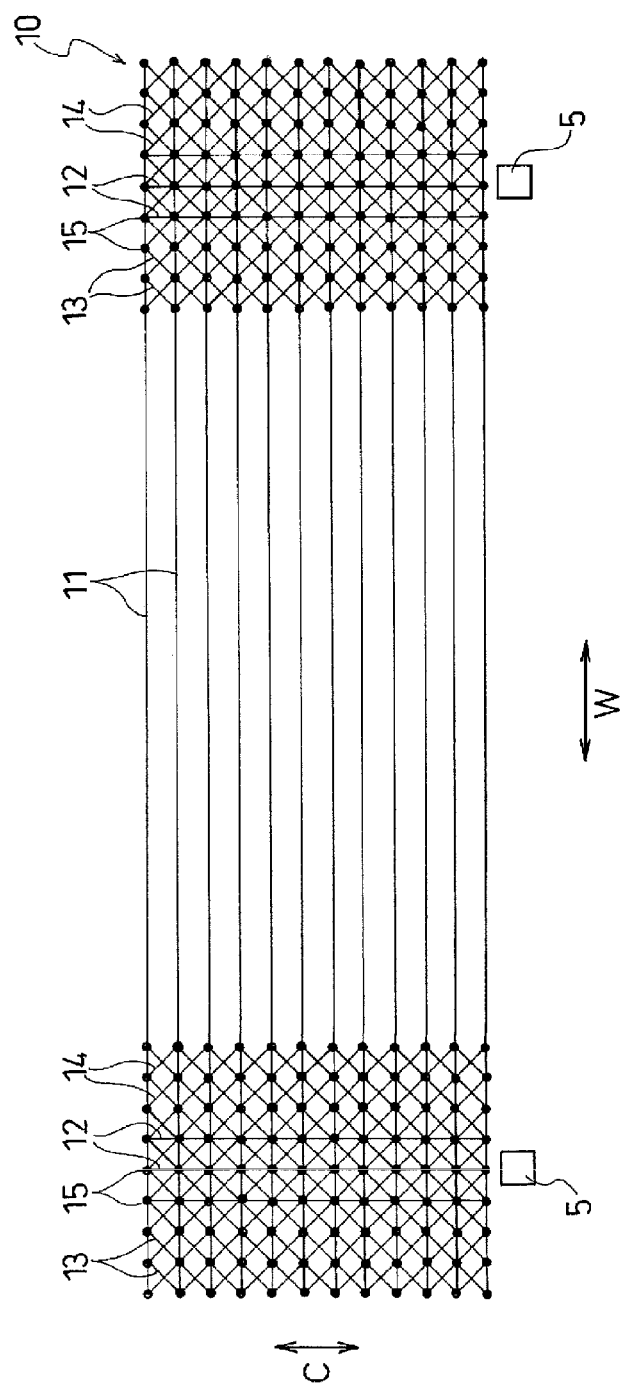
FIG. 14 is a plan view illustrating an example of the reinforcing member used for a carcass layer of the pneumatic tire according to the present technology.

FIG. 14 illustrates one example of the reinforcing member used for the carcass layer of the pneumatic tire according to the present technology. As illustrated in FIG. 14, the reinforcing member 10 having a mesh-like structure includes the plurality of reinforcing cords 11 to 14 oriented in four directions. That is, the reinforcing cord 11 extends in parallel with the tire width direction W across the entire region in the tire width direction W, the reinforcing cord 12 extends in parallel with the tire circumferential direction C in only the region adjacent to the bead core 5, the reinforcing cord 13 extends so as to incline to one side with respect to the tire width direction W in only the region on the bead portion 3 side, and the reinforcing cord 14 extends so as to incline to the other side with respect to the tire width direction W in only the region on the bead portion 3 side. Note that, while the tire width direction W is the direction of the sheet-like reinforcing member 10, the tire width direction W is recognized as the tire radial direction when the reinforcing member 10 is machined to the pneumatic tire. At the intersecting locations of these reinforcing cords 11 to 14, at least three of the reinforcing cords 11 to 14 oriented in different directions are integrally joined together, forming a plurality of joined portions 15.

The material of the reinforcing cords 11 to 14 is not particularly limited, allowing use of a synthetic fiber cord or a steel cord. Examples include a structure in which a synthetic fiber cord is used for all of the reinforcing cords 11 to 14, a structure in which a synthetic fiber cord is used for the reinforcing cords 11, 13, 14 while a steel cord is used for the reinforcing cord 12, a structure in which a steel cord is used for the reinforcing cord 11 while a synthetic fiber cord is used for the reinforcing cords 12 to 14, and a structure in which a steel cord is used for the reinforcing cords 11, 12 while a synthetic fiber cord is used for the reinforcing cords 13, 14.

The method of joining the reinforcing cords 11 to 14 is not particularly limited, allowing use of a variety of methods. With synthetic fiber cords, the joined portion 15 can be formed so that the cords form a knot, the joined portion 15 can be formed so that both fiber bundles (yarn) intersect each other without the cords forming a knot, the joined portion 15 can be formed by welding the cords together, and the joined portion 15 can be formed by adhering the cords together. With steel cords, the joined portion 15 can be formed so that both filaments intersect each other without the cords forming a knot, the joined portion 15 can be formed by welding the cords together, and the joined portion 15 can be formed by adhering the cords together. In any case, the reinforcing cords 11 to 14 need to be integrally joined at intersecting locations so that the cords mutually regulate the cord positions.

The reinforcing member 10 thus configured, as made clear by the comparative explanation of FIGS. 3 and 4 described above, includes the plurality of reinforcing cords 11 to 14 oriented in at least three directions in a region on the bead portion 3 side, and has a mesh-like structure in which at least three of the reinforcing cords 11 to 14 oriented in different directions are joined together at at least a portion of the intersecting locations of these reinforcing cords 11 to 14, making it possible to improve the in-plane bending rigidity while maintaining excellent flexibility with respect to out-of-plane deformation.

Thus, in the pneumatic tire further including the carcass layer 4 disposed extending between the pair of bead portions 3, 3, when the reinforcing member 10 having a mesh-like structure described above is used as the carcass layer 4, the tire circumferential rigidity can be increased without relying on an additional bead reinforcing layer, and the steering stability can be enhanced without substantially increasing tire weight. Note that, while the reinforcing member 10 has a mesh-like structure in which at least three of the reinforcing cords 11 to 14 oriented in different directions are joined together in a region on the bead portion 3 side, the reinforcing member 10 does not have a mesh-like structure on the tread portion 1 side, thereby allowing expansion in the tire molding step. From such a perspective, preferably the reinforcing member 10 does not have any joined points 15 outward in the tire radial direction from a tire maximum width position.

Figure 15:
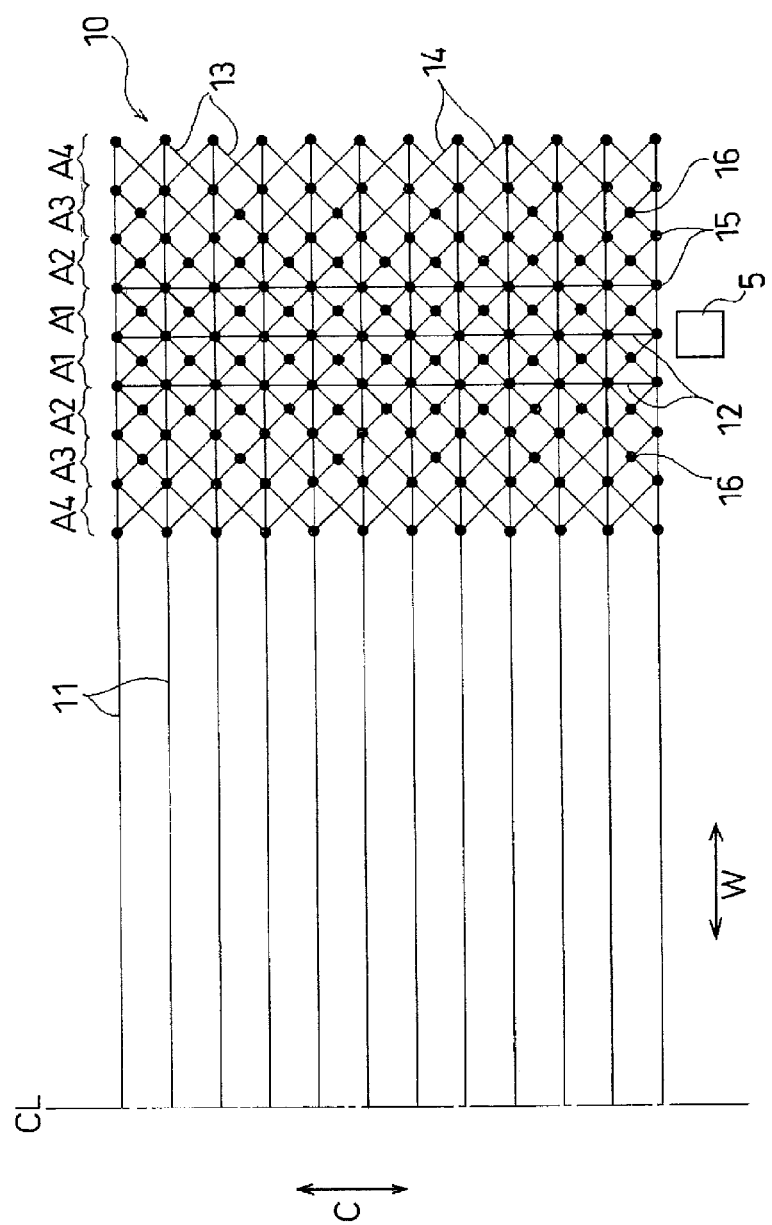
FIG. 15 is a plan view illustrating a modified example of the reinforcing member used for the carcass layer of the pneumatic tire according to the present technology.

FIG. 15 illustrates a modified example of the reinforcing member used for the carcass layer of the pneumatic tire according to the present technology. FIG. 15 illustrates only the left side of the tire center line CL, extracted. In FIG. 15, at least three of the reinforcing cords 11 to 14 are integrally joined at the intersecting locations where at least three of the reinforcing cords 11 to 14 intersect to form a plurality of the joined portions 15, and the two reinforcing cords 13, 14 are integrally joined at at least a portion of the intersecting locations of the two reinforcing cords 13, 14 to form a plurality of the joined portions 16. Then, when the region where the joined portions 15, 16 of the reinforcing member 10 is partitioned into the four regions A1 to A4 outward in the tire radial direction from the position of the bead cores 5 (outward in the tire width direction from the position of the bead core 5 in the plan view of FIG. 15), the density of the joined portions 15, 16 in these regions A1 to A4 is set so as to increase inward in the tire radial direction. However, the densities of the joined portions 15, 16 in the regions A1, A2 are equal. According to such an arrangement, it is possible to effectively improve the in-plane bending rigidity without inhibiting deformation of the reinforcing member 10 constituting the carcass layer 4 in the tire molding step.

Figure 16:
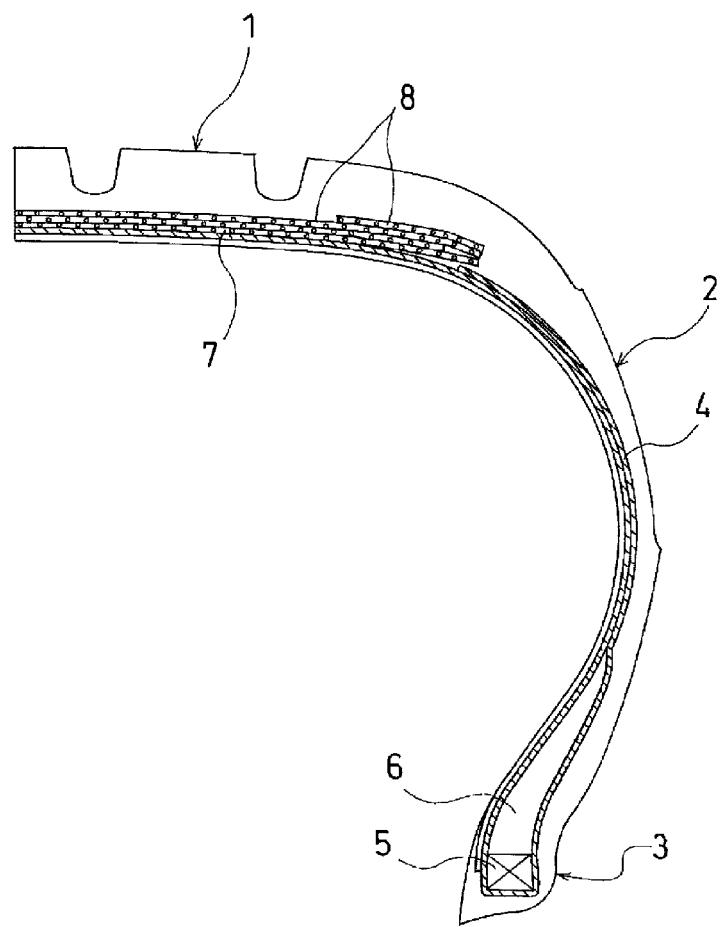
FIG. 16 is a half cross-sectional view taken along a meridian illustrating the pneumatic tire according to another embodiment of the present technology.
Figure 17:
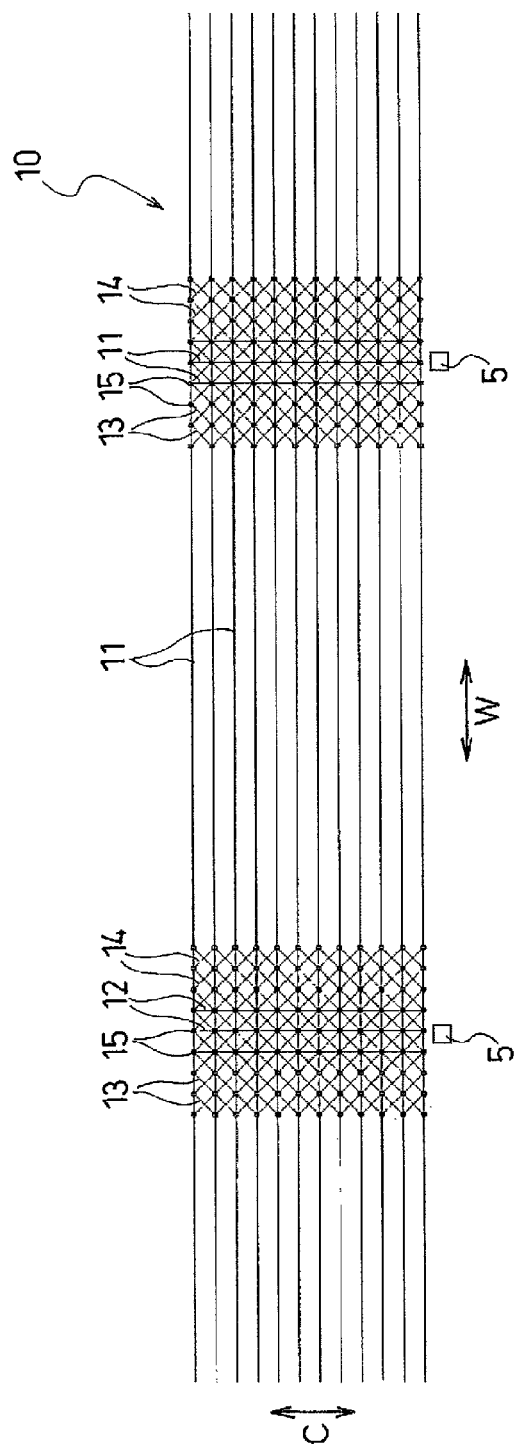
FIG. 17 is a plan view illustrating an example of the reinforcing member used for the carcass layer of the pneumatic tire in FIG. 16.

FIG. 16 illustrates a pneumatic tire according to another embodiment of the present technology, and FIG. 17 illustrates the reinforcing member used for the carcass layer of the pneumatic tire. In FIG. 16, the carcass layer 4, having a turned up structure, is folded back around the bead cores 5 disposed in each of the bead portions 3, from the inside of the tire to the outside of the tire, and the folded end portion is disposed so as to be inserted between the belt layer 7 and the carcass layer 4.

The reinforcing member 10 used for such a carcass layer 4, as illustrated in FIG. 17, includes the plurality of reinforcing cords 11 to 14 oriented in at least three directions in regions on each bead portion 3 side, and has a mesh-like structure in which at least three of the reinforcing cords 11 to 14 oriented in different directions are joined together at at least a portion of the intersecting locations of the reinforcing cords 11 to 14. That is, while the reinforcing cord 11 extending in the tire width direction W extends across the entire region in the tire width direction W, the mesh-like structure including the joined portions 15 is selectively formed in only the regions corresponding to the bead portions 3. In this case as well, it is possible to improve in-plane bending rigidity while maintaining excellent flexibility with respect to the out-of-plane deformation of the reinforcing member 10.

The carcass layer 4 described above can be formed by machining the reinforcing member 10 having a mesh-like structure into an annular shape without ends. That is, the reinforcing member 10 can be woven and formed into an annular shape. In this case, the durability of the pneumatic tire is improved. Of course, the carcass layer 4 can also be formed by winding the reinforcing member 10 having a mesh-like structure one or more times in the tire circumferential direction. In this case, the reinforcing member 10 having a mesh-like structure can be treated in the same way as a conventional carcass member, simplifying the manufacture of the pneumatic tire.

Figure 18:
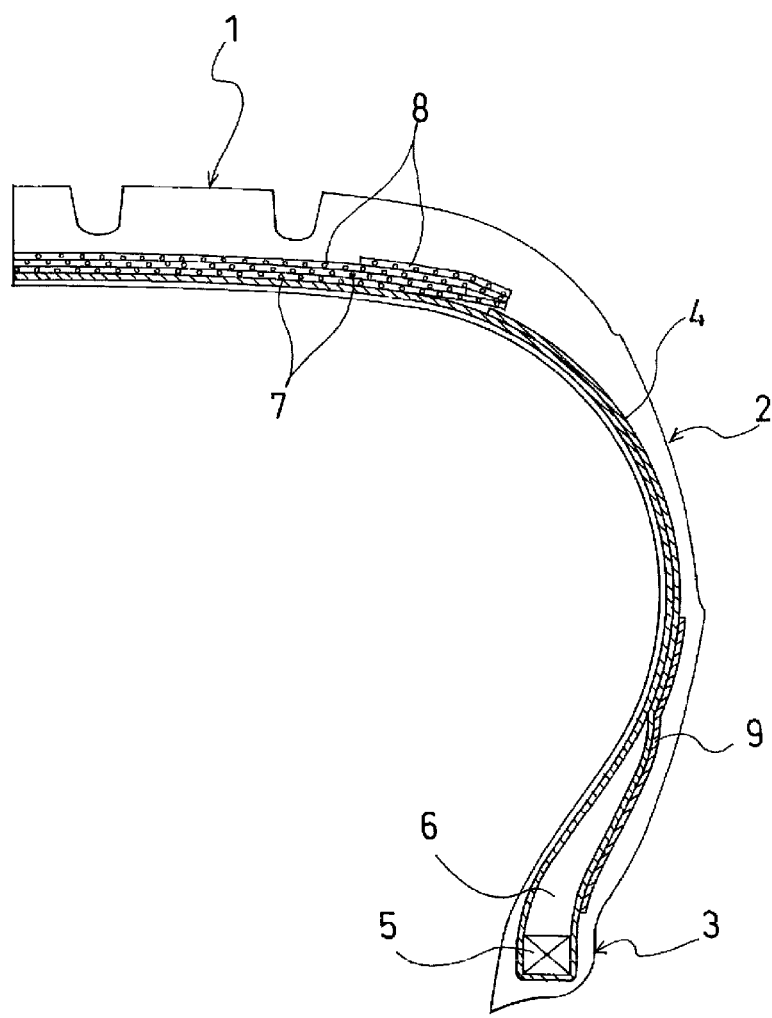
FIG. 18 is a half cross-sectional view taken along a meridian illustrating the pneumatic tire according to another embodiment of the present technology.
Figure 19:
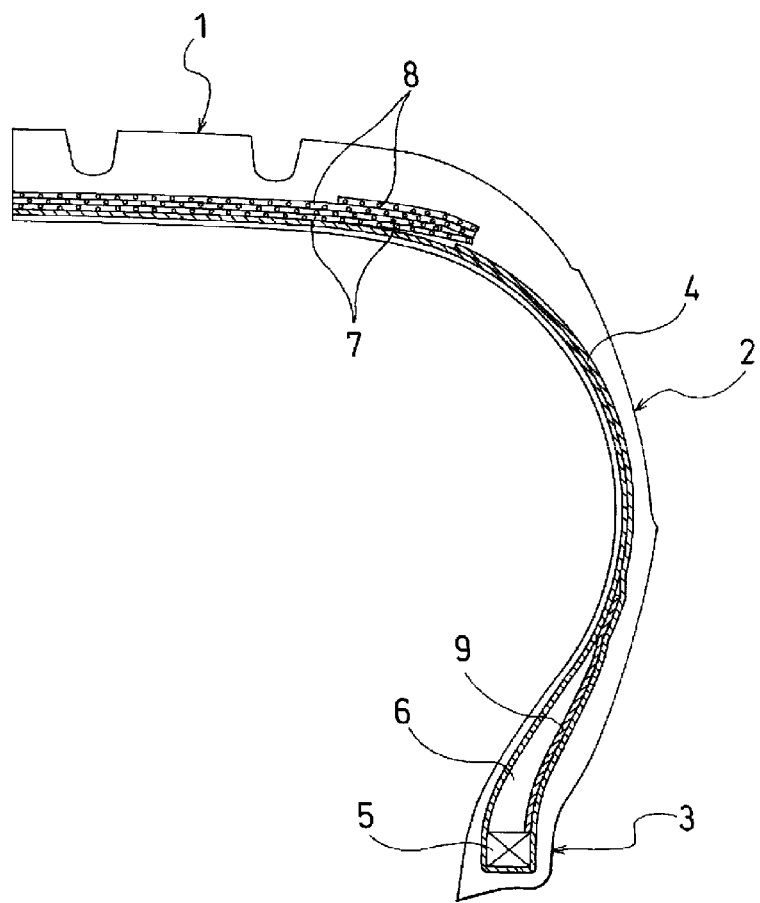
FIG. 19 is a half cross-sectional view taken along a meridian illustrating the pneumatic tire according to another embodiment of the present technology.
Figure 20:
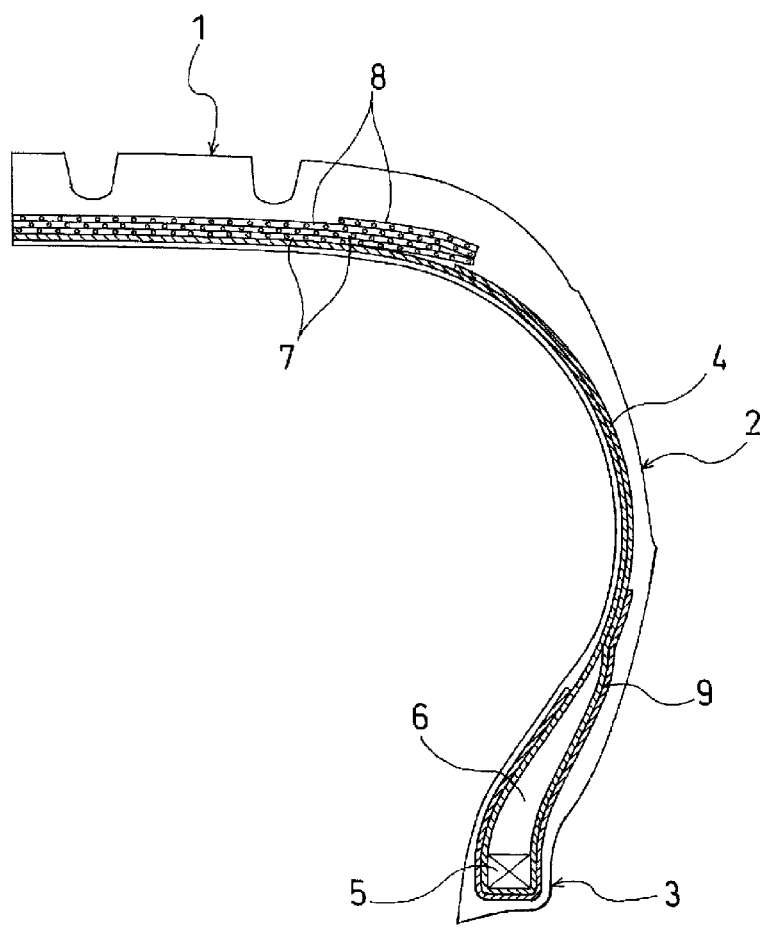
FIG. 20 is a half cross-sectional view taken along a meridian illustrating the pneumatic tire according to another embodiment of the present technology.

FIGS. 18 to 20 each illustrate a pneumatic tire according to another embodiment of the present technology. As illustrated in FIGS. 18 to 20, the pneumatic tire of the present embodiment includes the annular-shaped tread portion 1 extending in the tire circumferential direction, the pair of sidewall portions 2, 2 disposed on both sides of the tread portion 1, and the pair of bead portions 3, 3 disposed inward of the sidewall portions 2 in the tire radial direction.

The carcass layer 4 is disposed extending between the pair of bead portions 3, 3. The carcass layer 4 includes a plurality of reinforcing cords extending in the tire radial direction, and is folded back around the bead cores 5 disposed in each of the bead portions 3 from the tire inner side to the tire outer side. The bead filler 6 having a triangular cross-sectional shape formed from a rubber composition is disposed on the outer periphery of the bead core 5.

On the other hand, the belt layer 7 is embedded on the outer circumferential side of the carcass layer 4 in the tread portion 1. The belt layer 7 includes a plurality of reinforcing cords that are inclined with respect to the tire circumferential direction, and is disposed so that the reinforcing cords of the different layers intersect each other. In the belt layer 7, the inclination angle of the reinforcing cords with respect to the tire circumferential direction is set in a range from, for example, 10° to 40°. Steel cords are preferably used as the reinforcing cords of the belt layer 7. For the purpose of improving high-speed durability, at least one layer of the belt cover layer 8 formed by arranging reinforcing cords at an angle of, for example, not greater than 5° with respect to the tire circumferential direction, is disposed on the outer circumferential side of the belt layer 7. Nylon, aramid, or similar synthetic fiber cords are preferably used as the reinforcing cords of the belt cover layer 8. Note that the belt cover layer 8 is not essential.

Furthermore, a bead reinforcing layer 9 is embedded in a region from the bead portion 3 to the sidewall portion 2. This bead reinforcing layer 9 includes the reinforcing member 10 having a specific mesh-like structure described below, and extends along the bead filler 6 in the tire circumferential direction. The bead reinforcing layer 9 may be disposed outward in the tire width direction from the folded back portion of the carcass layer 4 as in FIG. 18, may be disposed between the folded back portion and the bead filler 6 as in FIG. 19, or may be folded back around the bead core 5 with the carcass layer 4 so as to wrap the carcass layer 4 as in FIG. 20.

Figure 21:
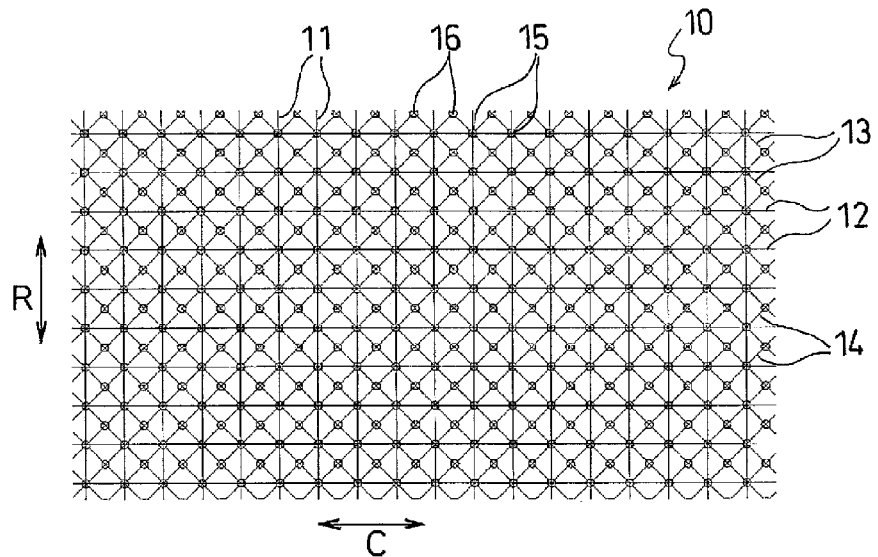
FIG. 21 is a plan view illustrating an example of the reinforcing member used for a bead reinforcing layer of the pneumatic tire according to the present technology.

FIG. 21 illustrates an example of the reinforcing member used for the bead reinforcing layer of the pneumatic tire according to the present technology. As illustrated in FIG. 21, the reinforcing member 10 having a mesh-like structure includes the plurality of reinforcing cords 11 to 14 oriented in four directions. That is, the reinforcing cord 11 extends in parallel with a tire radial direction R, the reinforcing cord 12 extends in parallel with the tire circumferential direction C, the reinforcing cord 13 extends so as to incline to one side with respect to the tire radial direction R, and the reinforcing cord 14 extends so as incline to the other side with respect to the tire radial direction R. At the intersecting locations of the plurality of reinforcing cords 11 to 14, the plurality of reinforcing cords 11 to 14 oriented in different directions are joined together, forming a plurality of joined portions 15, 16. More specifically, at least three of the reinforcing cords 11 to 14 are integrally joined at the intersecting locations of at least three of the reinforcing cords 11 to 14 to form a plurality of the joined portions 15, and the two reinforcing cords 13, 14 are integrally joined at the intersecting locations of the two reinforcing cords 13, 14 to form a plurality of the joined portions 16.

Figure 22:
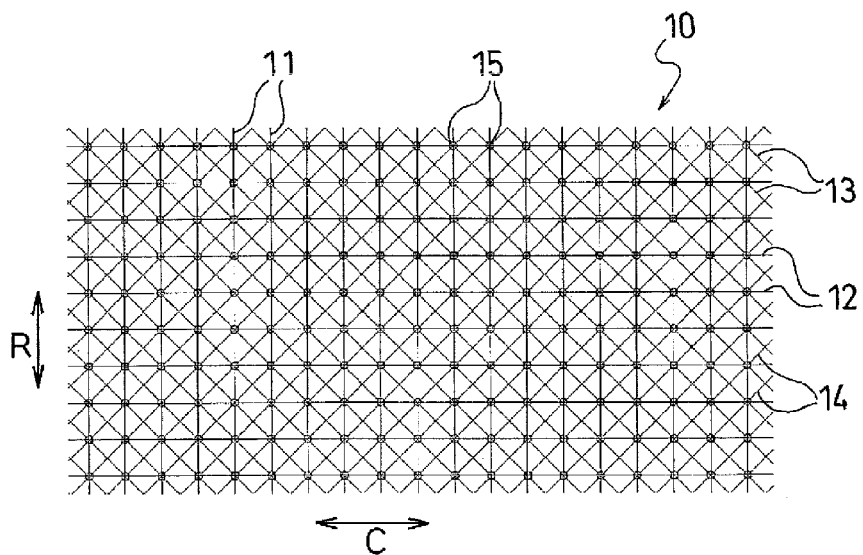
FIG. 22 is a plan view illustrating a modified example of the reinforcing member used for the bead reinforcing layer of the pneumatic tire according to the present technology.

FIG. 22 illustrates a modified example of the reinforcing member used for the bead reinforcing layer of the pneumatic tire according to the present technology. In FIG. 22, although at least three of the reinforcing cords 11 to 14 are integrally joined at the intersecting locations where at least three of the reinforcing cords 11 to 14 intersect to form a plurality of the joined portions 15, the joined portion 16 is not formed at the intersecting locations where the two reinforcing cords 13, 14 intersect.

The material of the reinforcing cords 11 to 14 is not particularly limited, allowing use of a synthetic fiber cord or a steel cord. Examples include a structure in which a synthetic fiber cord is used for all of the reinforcing cords 11 to 14, a structure in which a synthetic fiber cord is used for the reinforcing cords 11, 13, 14 while a steel cord is used for the reinforcing cord 12, a structure in which a steel cord is used for the reinforcing cord 11 while a synthetic fiber cord is used for the reinforcing cords 12 to 14, and a structure in which a steel cord is used for the reinforcing cords 11, 12 while a synthetic fiber cord is used for the reinforcing cords 13, 14.

The method of joining the reinforcing cords 11 to 14 is not particularly limited, allowing use of a variety of methods. With synthetic fiber cords, the joined portions 15, 16 can be formed so that the cords form a knot, the joined portions 15, 16 can be formed so that both fiber bundles (yarn) intersect each other without the cords forming a knot, the joined portions 15, 16 can be formed by welding the cords together, and the joined portions 15, 16 can be formed by adhering the cords together. With steel cords, the joined portions 15, 16 can be formed so that both filaments intersect each other without the cords forming a knot, the joined portions 15, 16 can be formed by welding the cords together, and the joined portions 15, 16 can be formed by adhering the cords together. In any case, the reinforcing cords 11 to 14 need to be integrally joined at intersecting locations so that the cords mutually regulate the cord positions.

The reinforcing member 10 thus configured, as made clear by the comparative explanation of FIGS. 3 and 4 described above, includes the plurality of reinforcing cords 11 to 14 oriented in at least three directions, and has a mesh-like structure in which at least three reinforcing cords 11 to 14 oriented in different directions are joined together at at least a portion of the intersecting locations of the reinforcing cords 11 to 14, making it possible to improve the in-plane bending rigidity while maintaining excellent flexibility with respect to out-of-plane deformation.

As a result, in the pneumatic tire that further includes the bead reinforcing layer 9 embedded in the bead portion 3, when the reinforcing member 10 having a mesh-like structure is used as the bead reinforcing layer 9, the tire circumferential rigidity can be effectively improved, and the steering stability can be enhanced while suppressing an increase in tire weight. Further, the reinforcing member 10 exhibits excellent flexibility with respect to out-of-plane deformation, making it possible to favorably maintain the durability of the bead reinforcing layer 9.

Figure 23:
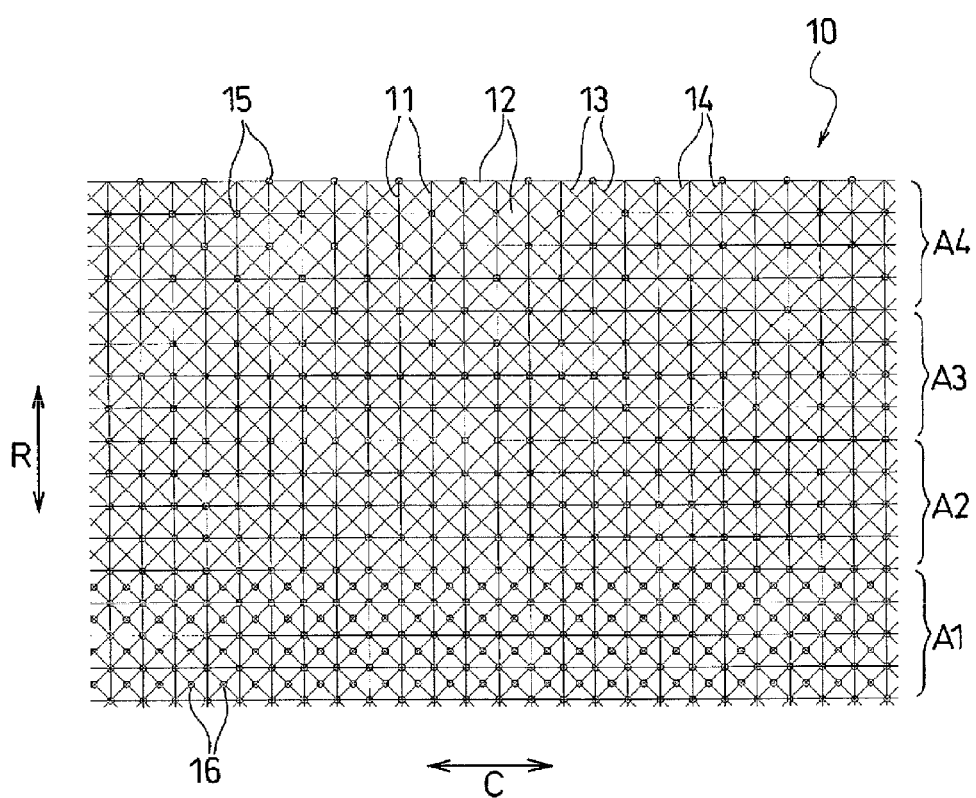
FIG. 23 is a plan view illustrating another modified example of the reinforcing member used for the bead reinforcing layer of the pneumatic tire according to the present technology.
Figure 24:
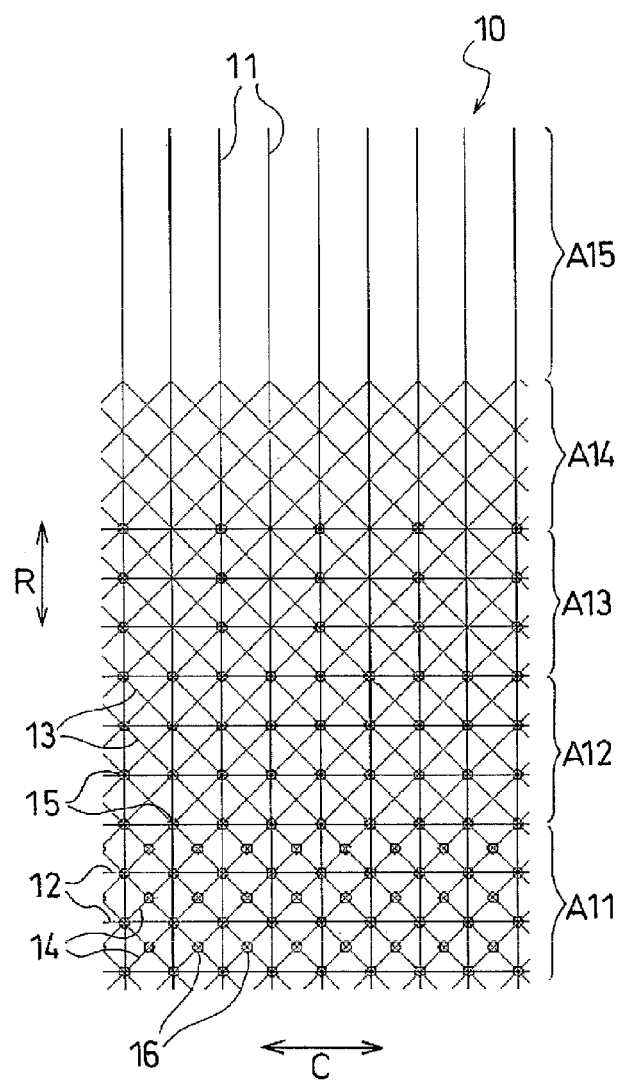
FIG. 24 is a plan view illustrating another modified example of the reinforcing member used for the bead reinforcing layer of the pneumatic tire according to the present technology.
Figure 25:
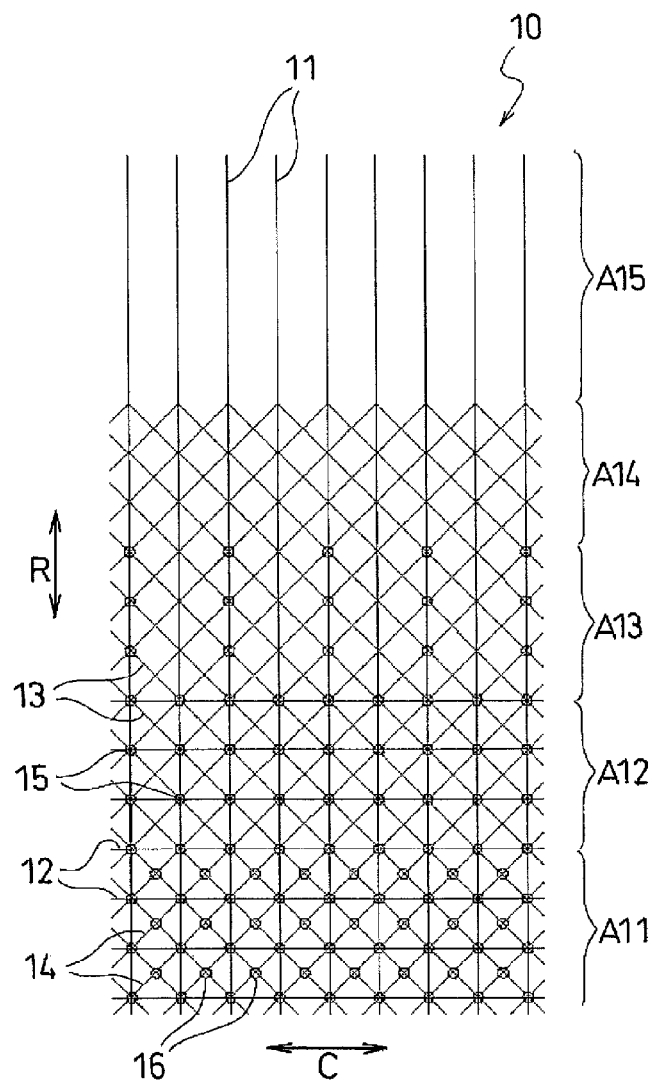
FIG. 25 is a plan view illustrating another modified example of the reinforcing member used for the bead reinforcing layer of the pneumatic tire according to the present technology.

FIGS. 23 to 25 each illustrate a modified example of the reinforcing member used for the bead reinforcing layer of the pneumatic tire according to the present technology. In FIG. 23, at least three of the reinforcing cords 11 to 14 are integrally joined at at least a portion of the intersecting locations where at least three of the reinforcing cords 11 to 14 intersect to form a plurality of the joined portions 15, and the two reinforcing cords 13, 14 are integrally joined at at least a portion of the intersecting locations of the two reinforcing cords 13, 14 to form a plurality of the joined portions 16. Then, when the reinforcing member 10 is partitioned into the four regions A1 to A4 in the tire radial direction R, the density of the joined portions 15, 16 of these regions A1 to A4 is set so as to increase inward in the tire radial direction. According to such an arrangement, sudden changes in rigidity based on the reinforcing member 10 are avoided, making it possible to effectively improve the in-plane bending rigidity of the bead reinforcing layer 9 while preventing a decrease in durability.

In FIG. 24, when the reinforcing member 10 is partitioned into five regions A11 to A15 in the tire radial direction R, the number of the reinforcing cords 11 to 14 in these regions A11 to A15 is set so as to decrease outward in the tire radial direction, and the density of the joined portions 15, 16 of the regions A11 to A15 is set so as to increase inward in the tire radial direction. In particular, the joined portions 15, 16 are disposed in only the regions A11 to A13 inward in the tire radial direction, the reinforcing cord 12 extending in the tire circumferential direction C is disposed in only the regions A11 to A13 inward in the tire radial direction, and the reinforcing cords 13, 14 inclined with respect to the tire radial direction R are disposed in only the regions A11 to A14 inward in the tire radial direction.

In FIG. 25, when the reinforcing member 10 is partitioned into the five regions A11 to A15 in the tire radial direction R, the number of the reinforcing cords 11 to 14 in these regions A11 to A15 is set so as to decrease outward in the tire radial direction, and the density of the joined portions 15, 16 of the regions A11 to A15 is set so as to increase inward in the tire radial direction. In particular, the joined portions 15, 16 are disposed in only the regions A11 to A13 inward in the tire radial direction, the reinforcing cord 12 extending in the tire circumferential direction C is disposed in only the regions A11 to A12 inward in the tire radial direction, and the reinforcing cords 13, 14 inclined with respect to the tire radial direction R are disposed in only the regions A11 to A14 inward in the tire radial direction.

In the examples in FIGS. 24 and 25, while the number of reinforcing cords 11 to 14 decreases outward in the tire radial direction and the density of the joined portions 15, 16 increases inward in the tire radial direction in the reinforcing member 10, the arrangement of the reinforcing cords 11 to 14 and the joined portions 15, 16 are suitably selected in this way, making it possible to appropriately set the tire circumferential rigidity. Note that, in FIGS. 24 and 25, the reinforcing cord 12 extending in the tire circumferential direction C is disposed inward in the tire radial direction from an apex of the bead filler 6.

The bead reinforcing layer 9 described above can be formed by machining the reinforcing member 10 having a mesh-like structure into an annular shape without ends. That is, the reinforcing member 10 can be woven and formed into an annular shape. In this case, the durability of the pneumatic tire is improved. Of course, the bead reinforcing layer 9 can also be formed by winding the reinforcing member 10 having a mesh-like structure one or more times in the tire circumferential direction. In this case, the reinforcing member 10 having a mesh-like structure can be treated in the same way as a conventional bead reinforcing member, simplifying the manufacture of the pneumatic tire.

While, in the pneumatic tires described above, at least three of the reinforcing cords 11 to 14 are joined together at all intersecting locations where at least three of the reinforcing cords 11 to 14 intersect, at least three of the reinforcing cords 11 to 14 are joined together at preferably at least 30%, and more preferably at least 50% (most preferably at least 70%) of the intersecting locations where at least three of the reinforcing cords 11 to 14 intersect. As a result, the effect of improving the in-plane bending rigidity can be sufficiently achieved. When this percentage is too small, the effect of enhancing the in-plane bending rigidity decreases.

Further, in the pneumatic tires described above, the intersection angles of at least three of the reinforcing cords 11 to 14 joined at the intersecting locations are preferably 15° or greater, and more preferably from 20° to 75°. As a result, the effect of improving the in-plane bending rigidity can be sufficiently achieved. When this intersection angle is too small, the effect of enhancing the in-plane bending rigidity decreases. Note that, in the embodiments in FIGS. 2, 14, 21, 22, and the like, the intersection angle of the reinforcing cords 11 to 14 is 45°.

In the pneumatic tires described above, a synthetic fiber cord having a tensile strength of 1.5 (cN/dtex) or greater, a knot strength of 1.5 (cN/dtex) or greater, and a loop strength of 2.5 (cN/dtex) or greater is preferably used as the reinforcing cords 11 to 14. With a synthetic fiber cord, the reinforcing member 10 having a mesh-like structure can be easily formed. Moreover, the synthetic fiber cord having the physical properties described above is suitable as the tire reinforcing material.

With regard to the above-described physical properties, preferably the tensile strength is 2.0 (cN/dtex) or greater, the knot strength is 2.0 (cN/dtex) or greater, and the loop strength is 3.5 (cN/dtex) or greater. More preferably, the tensile strength is 4.0 (cN/dtex) or greater, the knot strength is 3.0 (cN/dtex) or greater, and the loop strength is 5.0 (cN/dtex) or greater. Most preferably, the tensile strength is 5.0 (cN/dtex) or greater, the knot strength is 4.0 (cN/dtex) or greater, and the loop strength is 8.0 (cN/dtex) or greater. While the upper limit values are not particularly limited, values of 20 (cN/dtex) or less for knot strength, 20 (cN/dtex) or less for loop strength, and 15 (cN/dtex) or less for tensile strength are realistic. Note that the knot strength and the loop strength are measured in accordance with Japanese Industrial Standards (JIS) JIS L 1013 (Testing methods for manman filament yarns) and JIS L 1015 (Testing methods for man-made staple fibers), respectively.

Suitable synthetic fiber cords include a cord that contains aramid fiber, polyketone fiber, polyethylene terephthalate (PET) fiber, polyethylene naphthalate (PEN) fiber, high molecular weight polyethylene fiber (Toyobo Dyneema, or the like), or p-phenylenebenzobisoxazole (PBO) fiber. Of course, the material may differ in accordance with the cord extension direction. Further, a composite cord obtained by intertwining a fiber (aramid fiber, for example) made from a low elongation material, and a fiber (nylon fiber, for example) made from a high elongation material is preferred as the material of the reinforcing member 10 having a mesh-like structure since the characteristics of the high elongation material increases knot strength and the characteristics of the low elongation material increases the elastic modulus. Further, when synthetic fiber cords are connected, knots may be present or absent. However, from the perspective of reducing the thickness of the member, knots are preferably absent.

The thickness of the reinforcing cords 11 to 14 is preferably from 0.5 to 1.5 mm. When this thickness exceeds the upper limit value, the rubber layer thickens and the tire weight increases, deteriorating rolling resistance. When this thickness is below the lower limit value, the number of cords arranged needs to be increased to secure the same strength, thereby excessively increasing the density of the joined points and making manufacture of the reinforcing member 10 difficult.

Further, the reinforcing member 10 constituting the belt layer 7, the carcass layer 4, and the bead reinforcing layer 9 is preferably coated with rubber. As a result, the integrity of the reinforcing cords 11 to 14 is secured, making it possible to improve the in-plane bending rigidity of the reinforcing member 10.

Figure 26:
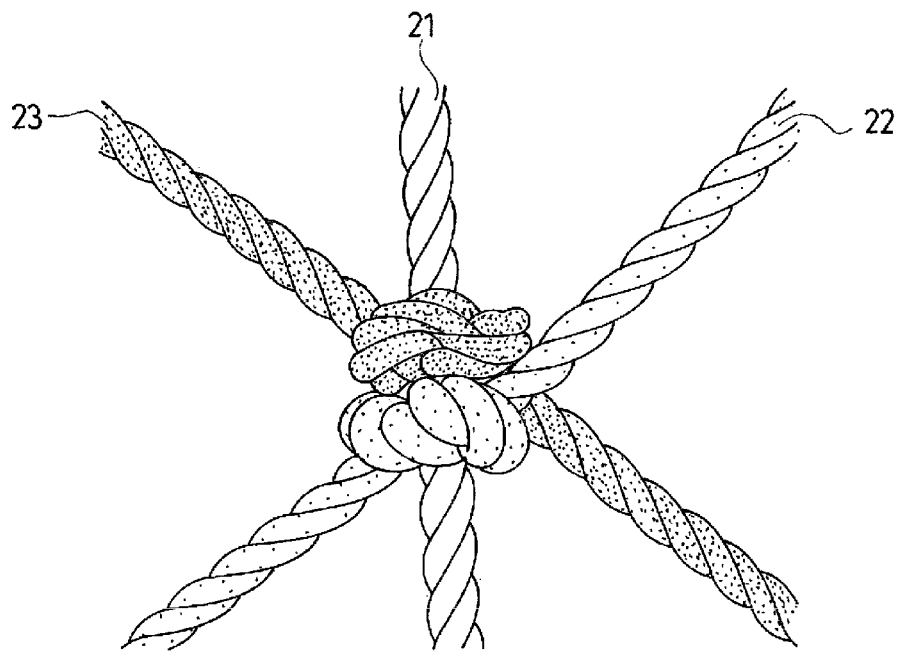
FIG. 26 is a plan view illustrating an example of a joined portion of the reinforcing member used for the present technology.
Figure 27:
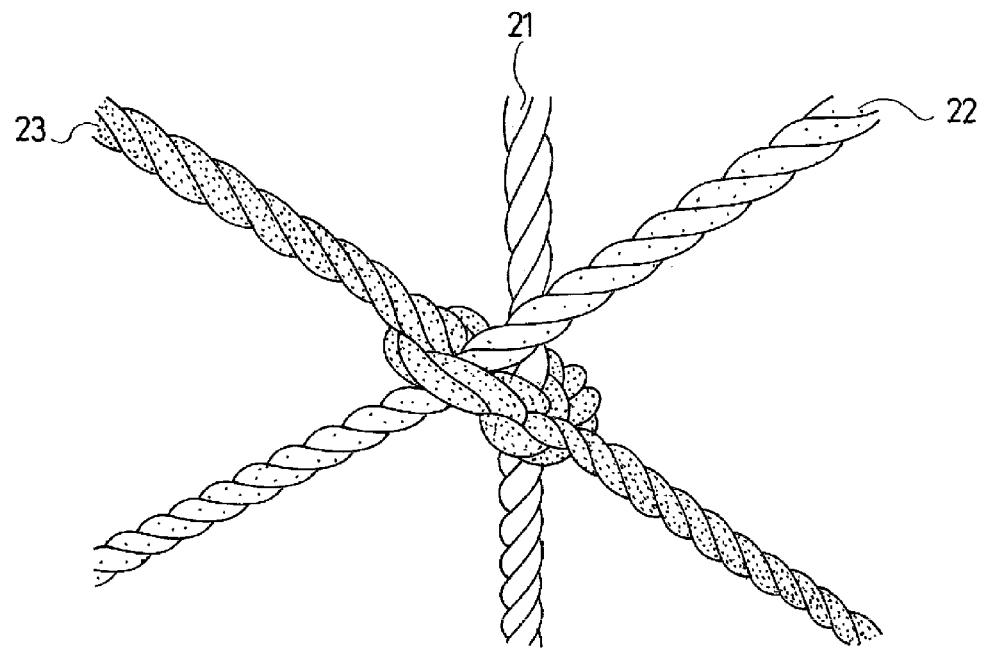
FIG. 27 is a plan view illustrating a modified example of the joined portion of the reinforcing member used in the present technology.
Figure 28:
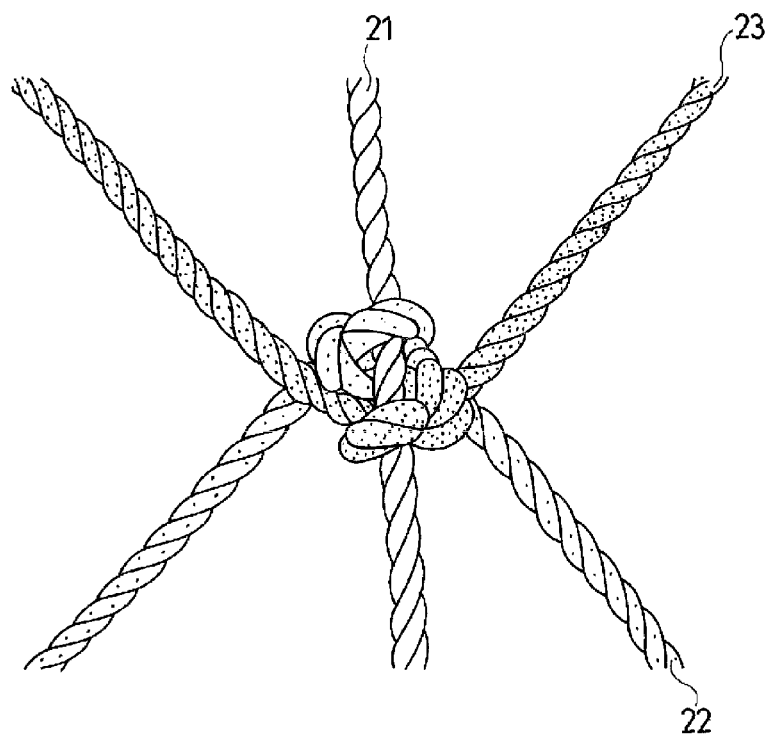
FIG. 28 is a plan view illustrating another modified example of the joined portion of the reinforcing member used in the present technology.
Figure 29:
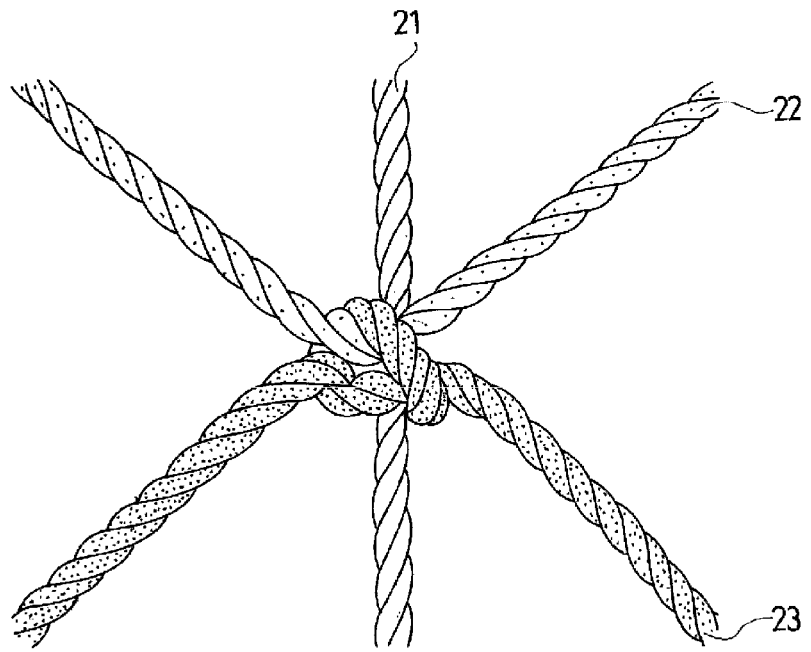
FIG. 29 is a plan view illustrating another modified example of the joined portion of the reinforcing member used in the present technology.
Figure 30:
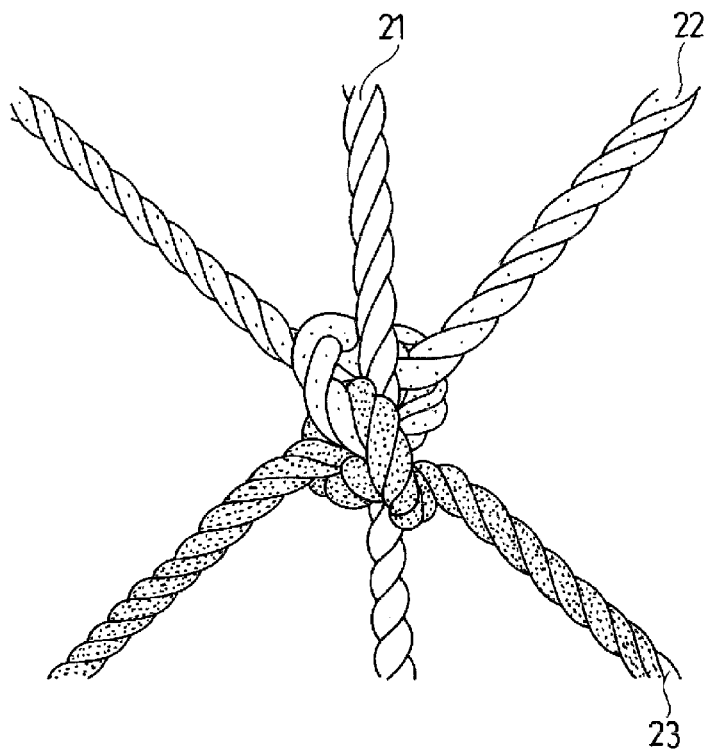
FIG. 30 is a plan view illustrating another modified example of the joined portion of the reinforcing member used in the present technology.
Figure 31:
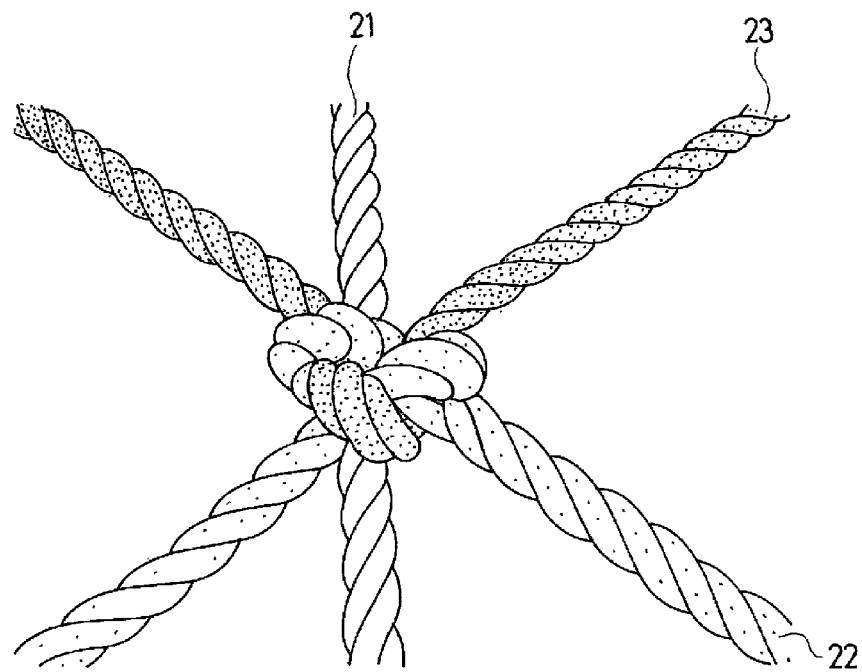
FIG. 31 is a perspective view illustrating another modified example of the joined portion of the reinforcing member used in the present technology.

Next, the joined portion of the reinforcing member used for the present technology will be specifically described with reference to FIGS. 26 to 37. FIG. 26 illustrates an example of three cords 21 to 23 joined together. In this example, the cords 22, 23 individually form knots, twisting around the cord 21 that does not have a knot. FIG. 27 illustrates an example of the three cords 21 to 23 joined together. In this example, the cord 23 individually forms a knot, twisting around the cords 21, 22 that do not have a knot. FIG. 28 illustrates an example of the three cords 21 to 23 joined together. In this example, the cords 22, 23 individually form knots, twisting around the cord 21 that does not have a knot, and the inclination directions of the cords 22, 23 are inverted with the knots serving as the boundary. FIG. 29 illustrates an example of the three cords 21 to 23 joined together. In this example, the cord 23 individually forms a knot, twisting around the cords 21, 22 that do not have a knot, and the inclination directions of the cords 22, 23 are inverted with the knot serving as the boundary. FIG. 30 illustrates an example of the three cords 21 to 23 joined together. In this example, the cords 22, 23 individually form knots, twisting around the cord 21 that does not have a knot, the knots are engaged with each other, and the inclination directions of the cords 22, 23 are inverted with the knots serving as the boundary. FIG. 31 illustrates an example of the three cords 21 to 23 joined together. In this example, the cords 22, 23 integrally form a knot, twisting around the cord 21 that does not have a knot, and the inclination directions of the cords 22, 23 are inverted with the knot serving as the boundary.

Figure 32:
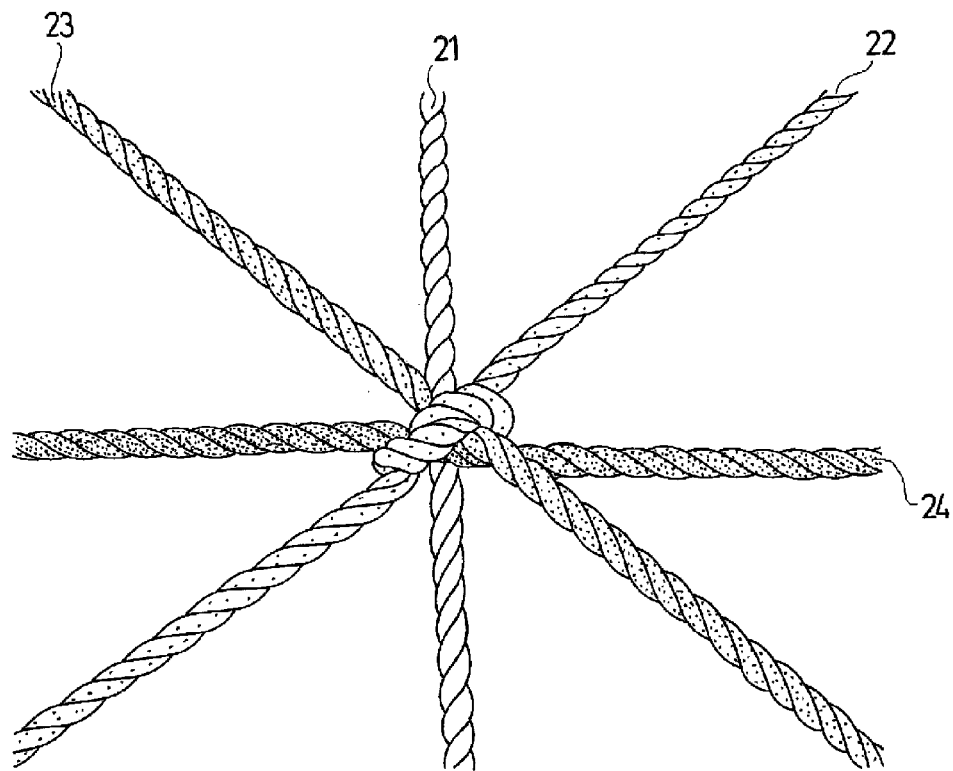
FIG. 32 is a plan view illustrating another modified example of the joined portion of the reinforcing member used in the present technology.
Figure 33:
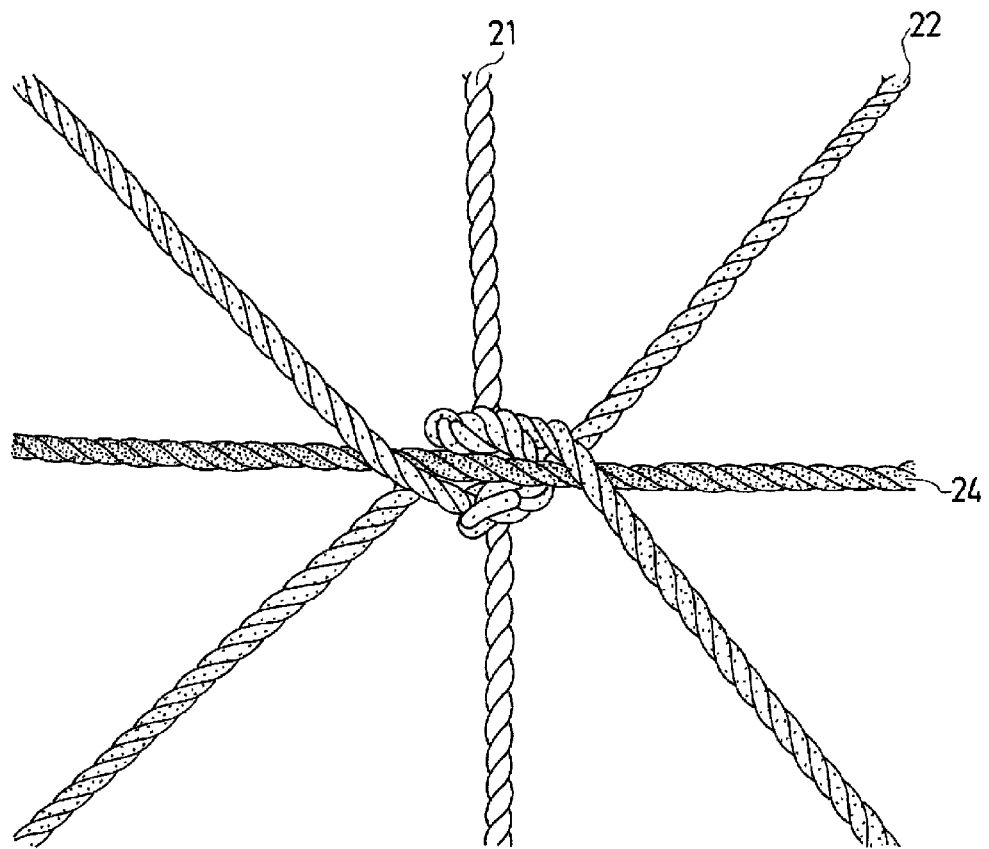
FIG. 33 is a plan view illustrating another modified example of the joined portion of the reinforcing member used in the present technology.

FIG. 32 illustrates an example of the four cords 21 to 24 joined together. In this example, the cord 22 individually forms a knot, twisting around the cords 21, 23, 24 that do not have a knot. FIG. 33 illustrates an example of the four cords 21 to 24 joined together. In this example, the cords 22, 23 individually form knots, twisting around the cord 21 that does not have a knot, the inclination directions of the cords 22, 23 are inverted with the knots serving as the boundary, and the cord 24 is inserted between the cords 22, 23. In FIGS. 26 to 33, for example, the cord 21 that does not have a knot is preferably oriented in the tire circumferential direction. When the cord 21 is disposed in the tire circumferential direction, a significant amount of tension is applied to the cord 21 and, by not having curvature from a knot, the tension can be effectively supported.

Figure 34:
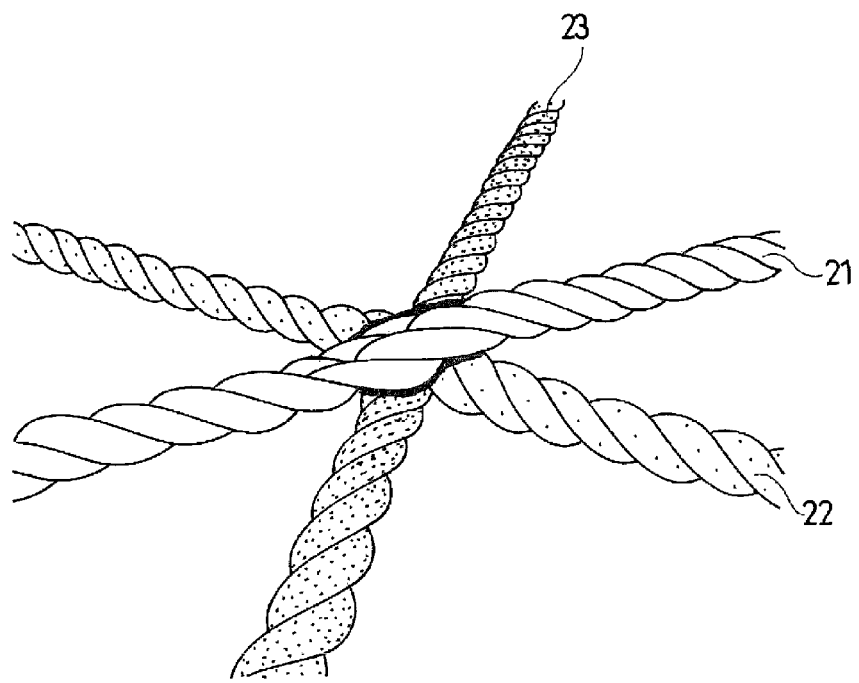
FIG. 34 is a perspective view illustrating another modified example of the joined portion of the reinforcing member used in the present technology.
Figure 35:
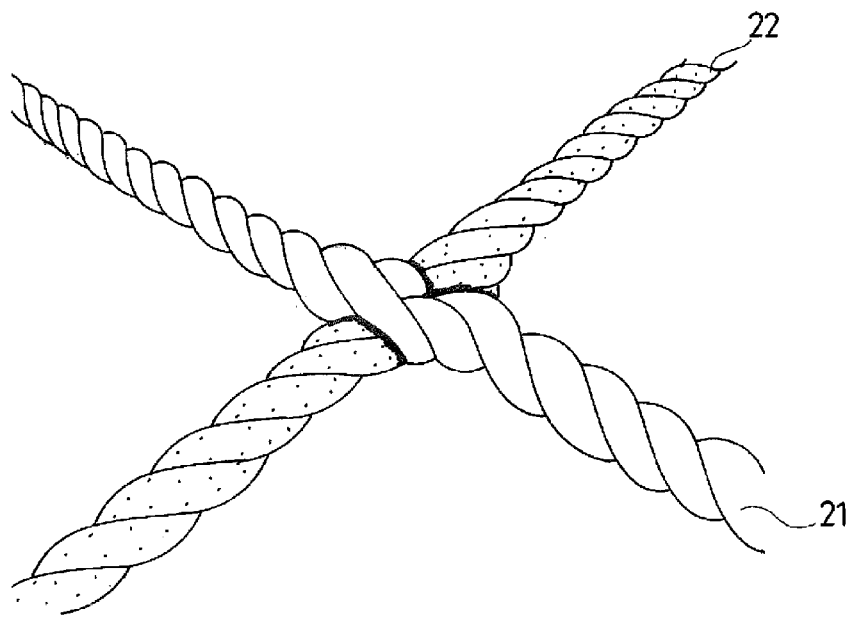
FIG. 35 is a perspective view illustrating another modified example of the joined portion of the reinforcing member used in the present technology.

FIG. 34 illustrates an example of the three cords 21 to 23 joined together by welding. When the cords 21 to 23 are chemical fibers and at least a portion thereof is made from a thermoplastic resin, the cords 21 to 23 can be integrated by performing a welding process such as heat welding or ultrasonic welding while compacting the crossing portions of the cords 21 to 23 in a thickness direction. FIG. 35 illustrates an example of the two cords 21, 22 joined together by welding.

Figure 36:
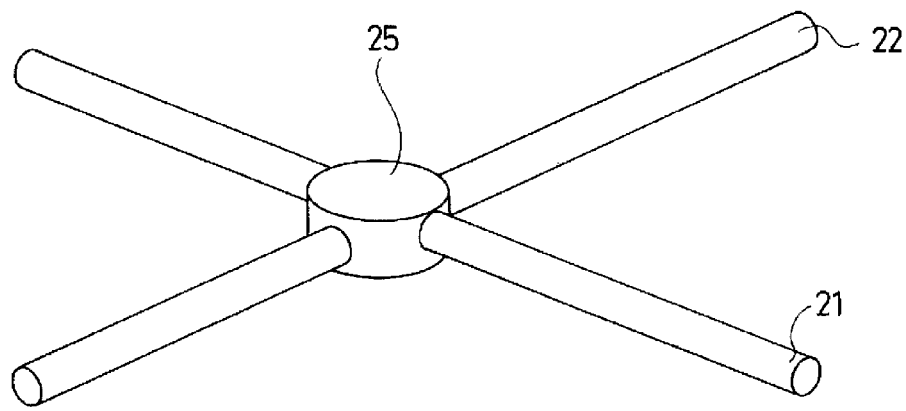
FIG. 36 is a perspective view illustrating another modified example of the joined portion of the reinforcing member used in the present technology.

FIG. 36 illustrates an example of the two cords 21, 22 joined together by another welding method. When the cords 21, 22 are chemical fibers and are made from a thermosetting resin, the cords 21, 22 can be integrated by arranging a bonding material 25 made from a thermoplastic resin so as to impregnate or wrap the fiber at the crossing portions of the cords 21, 22, and then performing a welding process such as heat welding or ultrasonic welding thereon.

Figure 37:
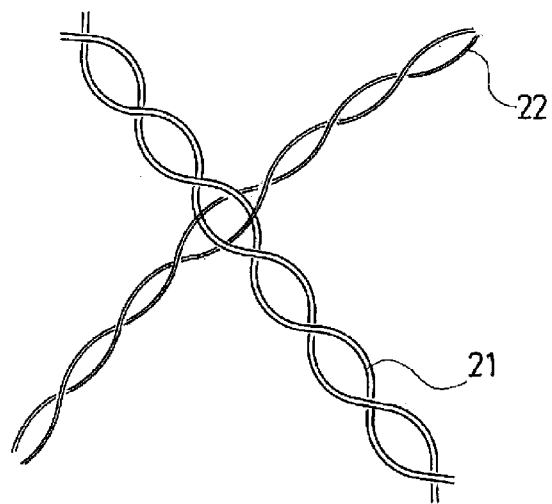
FIG. 37 is a perspective view illustrating another modified example of the joined portion of the reinforcing member used in the present technology.

FIG. 37 is an example of the two cords 21, 22 joined together without a knot. In this example, a knot-less joining portion is formed by intersecting yarns constituting the cords 21, 22. While the reinforcing member 10 increases in thickness when the joined portion has a knot, the thickness of the reinforcing member 10 can be decreased when a knot-less joined portion is formed.

While the embodiments above have described illustrative scenarios in which the reinforcing member having a specific mesh-like structure is applied to the belt layer, the carcass layer, or the bead reinforcing layer, such a reinforcing member having a specific mesh-like structure may be applied to various reinforcing layers constituting the pneumatic tire. When applied to any reinforcing layer, the reinforcing member improves in-plane bending rigidity while maintaining excellent flexibility with respect to out-of-plane deformation, allowing enhancement of various tire performance factors. Of course, such a reinforcing member having a mesh-like structure as described above may be simultaneously applied to a plurality of types of reinforcing layers.

Examples

Pneumatic tires provided with an annular-shaped tread portion extending in a tire circumferential direction, a pair of sidewall portions disposed on both sides of the tread portion, a pair of bead portions disposed on inward of the sidewall portions in a tire radial direction, a carcass layer disposed extending between the pair of bead portions, and a belt layer disposed on an outer circumferential side of the carcass layer in the tread portion were manufactured having a tire size of 215/55R17. In the tires of Examples 1 to 4, a reinforcing member (FIGS. 2, 5, 8, and 10) including a plurality of reinforcing cords oriented in at least three directions and having a mesh-like structure with at least three reinforcing cords oriented in different directions joined together at intersecting locations of the reinforcing cords was used as the belt layer.

For comparison, a pneumatic tire of Conventional Example 1 in which two belt layers having different inclination directions with respect to the tire circumferential direction of the reinforcing cords were embedded in the tread portion was prepared. Additionally, a tire of Comparative Example 1 in which a reinforcing member having a mesh-like structure in which two reinforcing cords oriented in different directions were joined together at intersecting locations of the plurality of reinforcing cords oriented in two different directions was prepared as the belt layer The cornering power and rolling resistance of these test tires were evaluated according to the following methods, and the results are shown in Table 1.

Cornering Power:

Each test tire was assembled on a wheel having a rim size of 17×7J, mounted on a flat-belt tester, run at an air pressure of 230 kPa, a load of 6.5 kN, and a speed of 20 km/h, and then measured for cornering power at a slip angle of ±1.0°. Evaluation results were expressed as index values, Conventional Example 1 being assigned an index value of 100. Higher index values indicate greater cornering power.

Rolling Resistance:

Each test tire was assembled on a wheel having a rim size of 17×7J, mounted on a rolling resistance tester provided with a 854 mm-radius drum, pre-run for 30 minutes at an ambient temperature of 25° C., an air pressure of 230 kPa, a load of 6.0 kN, and a speed of 80 km/h, and then measured for rolling resistance under the same conditions. The evaluation results were expressed as index values using the inverse of the measurement values, with Conventional Example 1 being defined as 100. Higher index values indicate lower rolling resistance.

reinforcing cords oriented in different directions joined together at intersecting locations of the reinforcing cords was used as the carcass layer.

For comparison, a pneumatic tire of Conventional Example 11 in which a carcass layer including a plurality of reinforcing cords extending in the tire radial direction was disposed extending between the pair of bead portions was prepared. Additionally, a tire of Comparative Example 11 in which a carcass layer including a plurality of reinforcing cords extending in the tire radial direction was disposed extending between the pair of bead portions, and two bead reinforcing layers were embedded from the bead portion to the sidewall portion was prepared.

These test tires were evaluated for tire weight and steering stability according to the following evaluation methods, and the results are shown in Table 2.

Tire Weight:

The weight of each test tire was measured. Evaluation results were expressed as index values using the inverse value of the measurement value, with the results of the Conventional Example 11 being defined as 100. Larger index values indicate lighter tire weight.

Steering Stability:

Each test tire was assembled on a wheel having a rim size of 17×7J, mounted on a test vehicle having an engine displacement of 3000 cc, and inflated to an air pressure of 230 kPa, and sensory evaluations were performed by a test driver. Evaluation results were expressed as index values with the Conventional Example 11 being defined as 100. Larger index values indicate superior steering stability.

TABLE 1

|  | Conventional Example 1 | Comparative Example 1 | Example 1 | Example 2 | Example 3 | Example 4 |
| --- | --- | --- | --- | --- | --- | --- |
| Joining of reinforcing cords of belt layer | Absent | Present | Present (FIG. 2) | Present (FIG. 5) | Present (FIG. 8) | Present (FIG. 10) |
| Orientation direction of reinforcing cords of belt layer | 2 directions | 2 directions | 4 directions | 4 directions | 4 directions | 3 directions |
| Cornering power (index value) | 100 | 101 | 110 | 108 | 109 | 106 |
| Rolling resistance (index value) | 100 | 101 | 108 | 106 | 107 | 104 |

As understood from Table 1, the tires of Examples 1 to 4 exhibited increased cornering power and reduced rolling resistance compared to that of Conventional Example 1. On the other hand, the tire of Comparative Example 1 exhibited substantially no effect of enhancing cornering power or rolling resistance.

Next, pneumatic tires provided with an annular-shaped tread portion extending in a tire circumferential direction, a pair of sidewall portions disposed on both sides of the tread portion, a pair of bead portions disposed inward of the sidewall portions in a tire radial direction, and a carcass layer disposed extending between the pair of bead portions were manufactured having a tire size of 215/55R17. In the tires of Examples 11 and 12, a reinforcing member (FIGS. 14 and 15) including a plurality of reinforcing cords oriented in at least three directions in a region on the bead portion side and having a mesh-like structure with at least three

TABLE 2

|  | Conventional Example 11 | Comparative Example 12 | Example 11 | Example 12 |
| --- | --- | --- | --- | --- |
| Joining of reinforcing cords of carcass layer | Absent | Absent | Present (FIG. 14) | Present (FIG. 15) |
| Presence/Absence of bead reinforcing layer | Absent | Present | Absent | Absent |
| Tire weight (index) | 100 | 97 | 100 | 100 |
| Steering stability (index value) | 100 | 105 | 105 | 106 |

As understood from Table 2, the tires of Examples 11 and 12 allowed an increase in tire circumferential rigidity without adding a bead reinforcing layer, making it possible to improve steering stability without substantially increasing tire weight in comparison to Conventional Example 11. On the other hand, in the tire of Comparative Example 1, while the effect of enhancing steering stability was confirmed, tire weight increased in association thereto.

Next, pneumatic tires provided with an annular-shaped tread portion extending in a tire circumferential direction, a pair of sidewall portions disposed on both sides of the tread portion, a pair of bead portions disposed on inner sides in a tire radial direction of the sidewall portions, a carcass layer disposed extending between the pair of bead portions, and a bead reinforcing layer embedded from the bead portion to the sidewall portion were manufactured having a tire size of 215/55R17. In the tires of Examples 21 to 24, a reinforcing member (FIGS. 21 to 24) including a plurality of reinforcing cords oriented in at least three directions and having a mesh-like structure with at least three reinforcing cords oriented in different directions joined together at intersecting locations of the reinforcing cords was used as the bead reinforcing layer.

For comparison, a pneumatic tire of Conventional Example 21 not provided with the bead reinforcing layer was prepared. Additionally, a tire of Comparative Example 21 in which two bead reinforcing layers including a plurality of reinforcing cords inclined in the tire radial direction were embedded from the bead portion to the sidewall portion was prepared.

The various test tires were evaluated for tire weight and steering stability according to the following evaluation methods, and the results are shown in Table 3.

Tire Weight:

The weight of each test tire was measured. The evaluation results were expressed, using the inverse value of the measurement value, as index values with the results of the Conventional Example 21 being defined as 100. Larger index values indicate lighter tire weight.

Steering Stability:

Each test tire was assembled on a wheel having a rim size of 17×7J, mounted on a test vehicle having an engine displacement of 3000 cc, and inflated to an air pressure of 230 kPa, and sensory evaluations were performed by a test driver. Evaluation results were expressed as index values with the Conventional Example 21 being defined as 100. Larger index values indicate superior steering stability.

TABLE 3

|  | Conventional Example 21 | Comparative Example 21 | Example 21 | Example 22 | Example 23 | Example 24 |
| --- | --- | --- | --- | --- | --- | --- |
| Presence/Absence of bead reinforcing layer | Absent | Present | Present | Present | Present | Present |
| Joining of reinforcing cords of bead reinforcing layer | — | Absent | Present (FIG. 21) | Present (FIG. 22) | Present (FIG. 23) | Present (FIG. 24) |
| Tire weight (index) | 100 | 96 | 98 | 98 | 98 | 98 |
| Steering Stability (index value) | 100 | 103 | 105 | 105 | 105 | 105 |

As understood from Table 3, the tires of Examples 21 to 24 exhibited high in-plane bending rigidity in the reinforcing member used for the bead reinforcing layer, making it possible to enhance steering stability while suppressing tire weight to a minimum in comparison to Conventional Example 21. On the other hand, in the tire of Comparative Example 21, while the effect of enhancing steering stability was confirmed, the effect was less than those of Examples 21 to 24 and tire weight significantly increased.

The invention claimed is:

1. A pneumatic tire, comprising:
   an annular-shaped tread portion extending in a tire circumferential direction;
   a pair of sidewall portions disposed on both sides of the tread portion;
   a pair of bead portions disposed inward of these sidewall portions in a tire radial direction; and
   a reinforcing member that includes a plurality of reinforcing cords oriented in at least three directions, and has a mesh-like structure with at least three of the reinforcing cords oriented in different directions joined together at at least a portion of intersecting locations of the reinforcing cords;
   wherein at least one cord of the plurality of reinforcing cords extending in one of the at least three directions extends inclined at an angle with respect to the tire width direction and with respect to the tire circumferential direction continuously across at least three cords of the plurality of reinforcing cords extending in another one of the at least three directions non-parallel to the tire width direction.

2. The pneumatic tire according to claim 1, wherein:
   the pneumatic tire further comprises a carcass layer disposed extending between the pair of bead portions, and a belt layer disposed on an outer circumferential side of the carcass layer in the tread portion; and
   the reinforcing member having a mesh-like structure is used as the belt layer.

3. The pneumatic tire according to claim 1, wherein at least three reinforcing cords are joined together at at least 30% of the intersecting locations where the at least three reinforcing cords intersect.

4. The pneumatic tire according to claim 1, wherein an intersection angle of the at least three reinforcing cords joined at intersecting locations is 15° or greater.

5. The pneumatic tire according to claim 1, wherein a belt layer is formed by winding the reinforcing member having a mesh-like structure in the tire circumferential direction.

6. The pneumatic tire according to claim 1, wherein a belt layer is formed by machining the reinforcing member having a mesh-like structure into an annular shape without ends.

7. The pneumatic tire according to claim 1, wherein the reinforcing cord includes a synthetic fiber cord having a knot strength of 1.5 (cN/dtex) or greater.

8. The pneumatic tire according to claim 1, wherein the reinforcing member having a mesh-like structure is coated with rubber.

9. The pneumatic tire according to claim 1, wherein:
the pneumatic tire further comprises a carcass layer disposed extending between the pair of bead portions; and
the reinforcing member having a mesh-like structure in a region on a bead portion side is used as the carcass layer.

10. The pneumatic tire according to claim 9, wherein at least three reinforcing cords are joined together at at least 30% of the intersecting locations where the at least three reinforcing cords intersect.

11. The pneumatic tire according to claim 9, wherein an intersection angle of at least three reinforcing cords joined at the intersecting locations is 15° or greater.

12. The pneumatic tire according to claim 9, wherein the carcass layer is formed by machining the reinforcing member having a mesh-like structure into an annular shape without ends.

13. The pneumatic tire according to claim 9, wherein the reinforcing cord includes a synthetic fiber cord having a knot strength of 1.5 (cN/dtex) or greater.

14. The pneumatic tire according to claim 9, wherein the reinforcing member having a mesh-like structure is coated with rubber.

15. The pneumatic tire according to claim 1, wherein:
the pneumatic tire further comprises a carcass layer disposed extending between the pair of bead portions, and a bead reinforcing layer embedded in the bead portions; and
the reinforcing member having a mesh-like structure is used as the bead reinforcing layer.

16. The pneumatic tire according to claim 15, wherein at least three reinforcing cords are joined together at at least 30% of the intersecting locations where the at least three reinforcing cords intersect.

17. The pneumatic tire according to claim 15, wherein an intersection angle of the at least three reinforcing cords joined at intersecting locations is 15° or greater.

18. The pneumatic tire according to claim 15, wherein a density of joined portions of the reinforcing cords of the reinforcing member increases inward in the tire radial direction.

19. The pneumatic tire according to claim 15, wherein the bead reinforcing layer is formed by machining the reinforcing member having a mesh-like structure into an annular shape without ends.

20. The pneumatic tire according to claim 15, wherein the reinforcing cord includes a synthetic fiber cord having a knot strength of 1.5 (cN/dtex) or greater.

21. The pneumatic tire according to claim 15, wherein the reinforcing member having a mesh-like structure is coated with rubber.

* * * * *